US012614309B2

(12) United States Patent
Ankelhed et al.

(10) Patent No.: US 12,614,309 B2
(45) Date of Patent: Apr. 28, 2026

(54) ONLINE INTRINSIC CALIBRATION

(71) Applicant: QUALCOMM Incorporated, San Diego, CA (US)

(72) Inventors: Daniel Ankelhed, Stockholm (SE); Bjoern Johansson, Linköping (SE); Hagen Spies, Stockholm (SE); Thomas Svantesson, Linköping (SE); Goesta Huldt, Linköping (SE); Per Johan Holm, Vendelsö (SE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/759,516

(22) Filed: Jun. 28, 2024

(65) Prior Publication Data

US 2026/0004458 A1      Jan. 1, 2026

(51) Int. Cl.
*G06T 17/00* (2006.01)
*B60W 50/06* (2006.01)
*G06T 3/14* (2024.01)
*G06T 7/50* (2017.01)
*G06T 7/80* (2017.01)
(Continued)

(52) U.S. Cl.
CPC .............. *G06T 7/80* (2017.01); *B60W 50/06* (2013.01); *H04N 17/002* (2013.01); *B60W 2420/403* (2013.01); *G06T 2207/30252* (2013.01)

(58) Field of Classification Search
CPC ........... G06T 7/80; G06T 2207/30252; B60W 50/06; B60W 2420/403; H04N 17/002
See application file for complete search history.

(56) References Cited

U.S. PATENT DOCUMENTS

2020/0126257 A1\*  4/2020  Tauber ...................... G06T 7/75
2021/0097280 A1\*  4/2021  Sharp, III ................. G06T 7/60
(Continued)

FOREIGN PATENT DOCUMENTS

CN      115471573 A  \* 12/2022   ............... G06T 7/73
CN      118736012 A  \* 10/2024   ............... G06T 7/73

OTHER PUBLICATIONS

Liu, Li translation of CN 118736012 A Jul. 30, 2024 (Year: 2024).\*
(Continued)

*Primary Examiner* — Zaihan Jiang
(74) *Attorney, Agent, or Firm* — QUALCOMM Incorporated

(57) ABSTRACT

Systems and techniques are provided for image processing for calibration. For example, a computing device can obtain image frames of a three-dimensional (3D) scene, each image frame including a plurality of two-dimensional (2D) points. Each 2D point corresponds to a 3D point. The computing device can determine a subset of 3D points by applying bundle adjustment on a set of 3D points (distributed over a field of view of the camera) and on fixed parameters of a camera. The computing device can determine inlier points from the subset of 3D points with a reprojection error less than a threshold value. The computing device can determine a final 3D points and final parameters of the camera by applying the bundle adjustment on the inlier points and on a prior set of camera parameters. The computing device can apply, to the camera, final intrinsic parameters of the final parameters of the camera.

20 Claims, 21 Drawing Sheets

(51) Int. Cl.
    *G06T 15/00*      (2011.01)
    *H04N 17/00*     (2006.01)

(56)                 References Cited

U.S. PATENT DOCUMENTS

| | | | |
|---|---|---|---|
| 2021/0264561 A1* | 8/2021 | Ely | G06T 7/337 |
| 2022/0076441 A1* | 3/2022 | Chakravarty | G06T 7/33 |
| 2022/0301192 A1* | 9/2022 | Boardman | G06T 7/579 |
| 2022/0398806 A1* | 12/2022 | Arksey | G05D 1/695 |
| 2023/0032712 A1* | 2/2023 | Mari | G01C 11/30 |
| 2023/0419629 A1* | 12/2023 | Huang | G06T 15/00 |
| 2024/0054731 A1* | 2/2024 | Wolke | G06T 7/75 |
| 2024/0161392 A1* | 5/2024 | Sun | G06V 10/82 |
| 2024/0216632 A1* | 7/2024 | Neal | A61M 16/0605 |
| 2025/0069241 A1* | 2/2025 | Ely | G06T 7/337 |
| 2025/0209740 A1* | 6/2025 | Revaud | G06T 17/00 |

OTHER PUBLICATIONS

Ou, Xiao-tian translation of CN 115471573 A Sep. 15, 2022 (Year: 2022).*

* cited by examiner

100

100

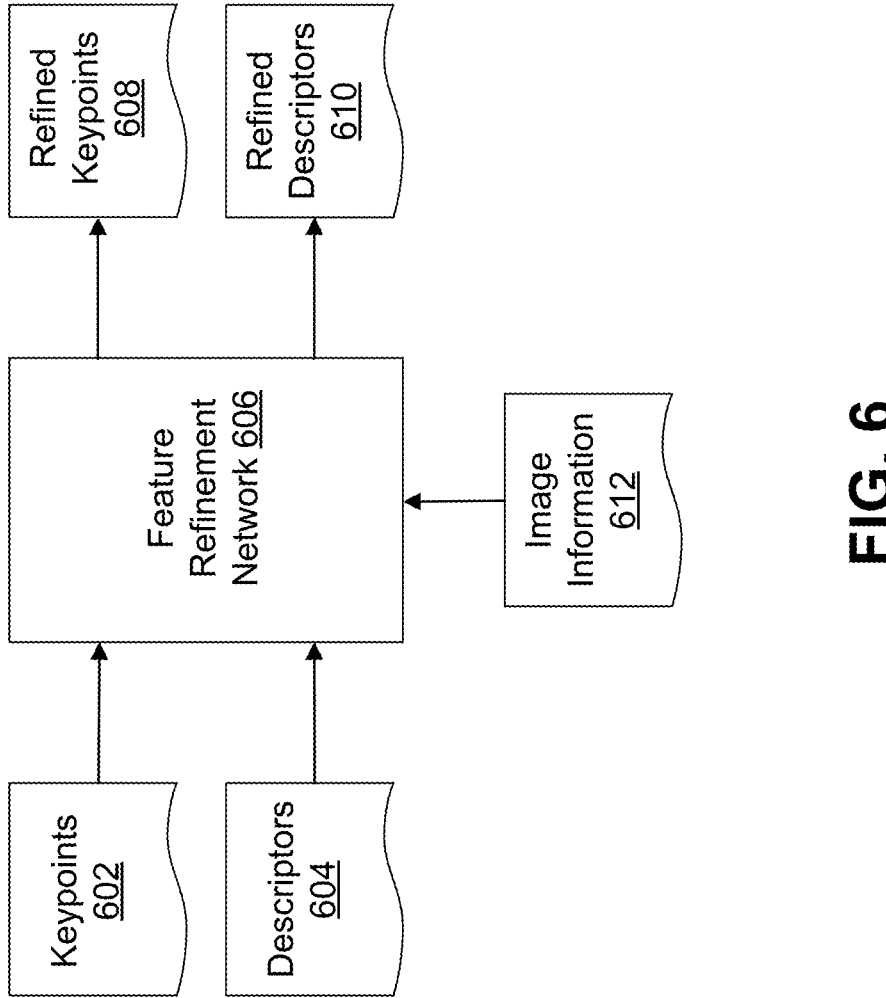
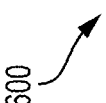
FIG. 6

1000

| #Step | Optimization variables | | | Robust | Max #Iterations | Threshold for average |
| | 3D points | Views | Intrinsics | | | |
|---|---|---|---|---|---|---|
| 0 | x | | | | 5 | 15px |
| 1 | x | x | | x | 5 | 15px |
| 2 | x | x | x | x | 30 | 5px |
| 3 | x | x | x | x | 100 | 1.5px |
| 4 | x | x | x | | 50 | |

1300
1320
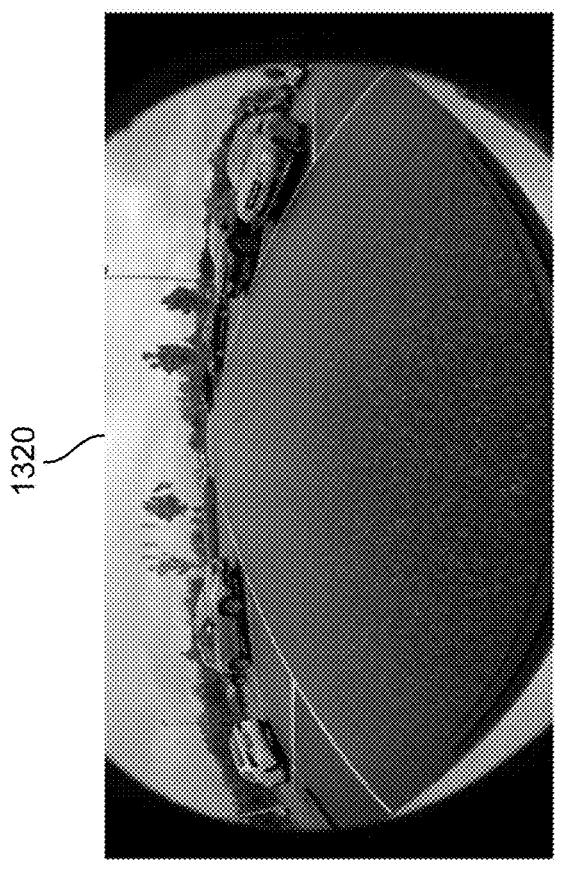
195 Degree FOV
1310
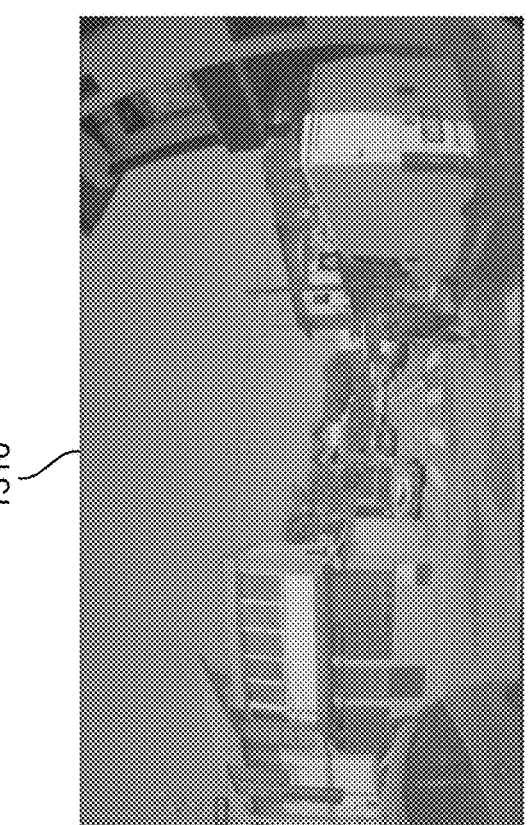
120 Degree FOV
FIG. 13

1700

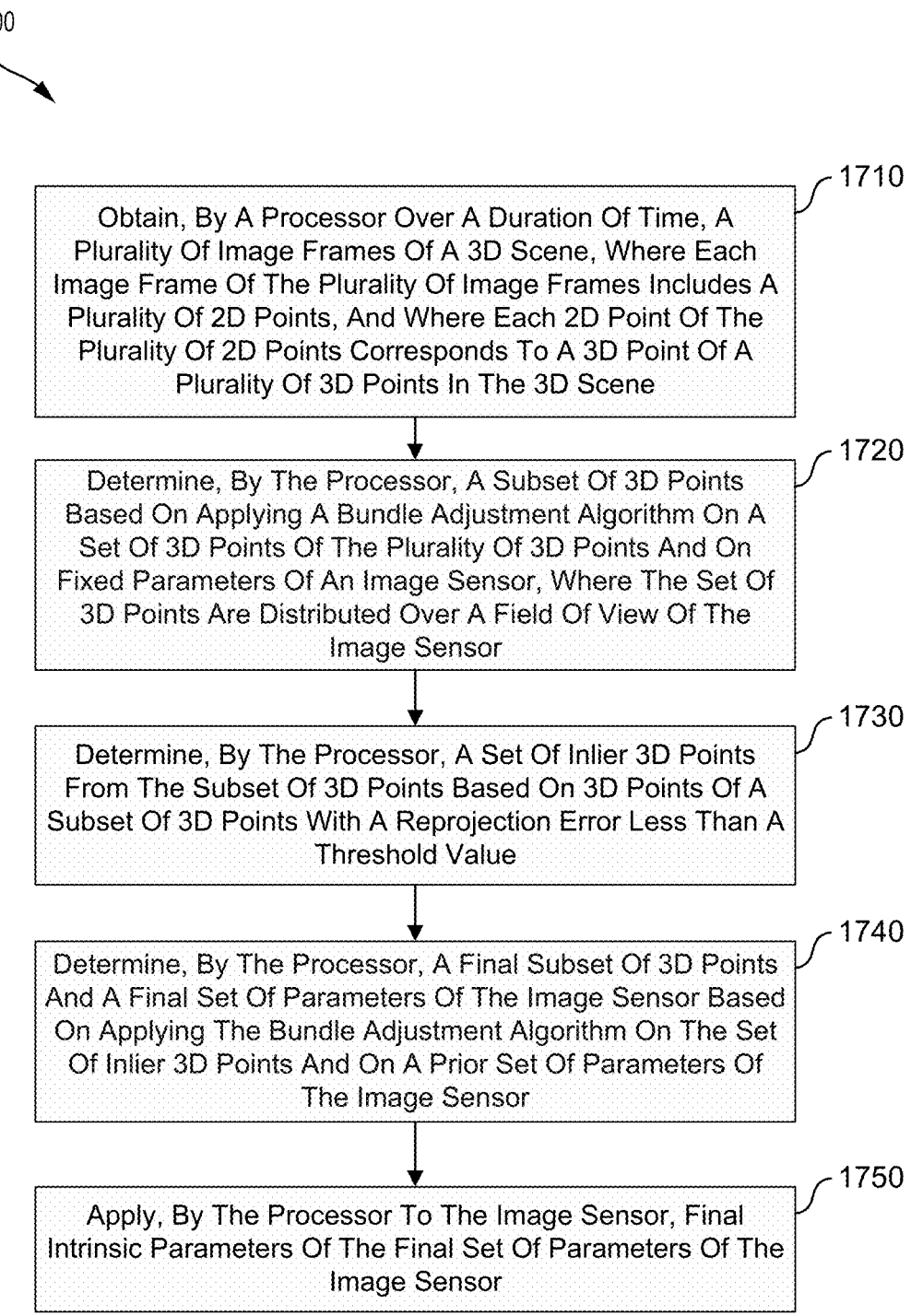

1710

Obtain, By A Processor Over A Duration Of Time, A Plurality Of Image Frames Of A 3D Scene, Where Each Image Frame Of The Plurality Of Image Frames Includes A Plurality Of 2D Points, And Where Each 2D Point Of The Plurality Of 2D Points Corresponds To A 3D Point Of A Plurality Of 3D Points In The 3D Scene

1720

Determine, By The Processor, A Subset Of 3D Points Based On Applying A Bundle Adjustment Algorithm On A Set Of 3D Points Of The Plurality Of 3D Points And On Fixed Parameters Of An Image Sensor, Where The Set Of 3D Points Are Distributed Over A Field Of View Of The Image Sensor

1730

Determine, By The Processor, A Set Of Inlier 3D Points From The Subset Of 3D Points Based On 3D Points Of A Subset Of 3D Points With A Reprojection Error Less Than A Threshold Value

1740

Determine, By The Processor, A Final Subset Of 3D Points And A Final Set Of Parameters Of The Image Sensor Based On Applying The Bundle Adjustment Algorithm On The Set Of Inlier 3D Points And On A Prior Set Of Parameters Of The Image Sensor

1750

Apply, By The Processor To The Image Sensor, Final Intrinsic Parameters Of The Final Set Of Parameters Of The Image Sensor

FIG. 17

ONLINE INTRINSIC CALIBRATION

FIELD

The present disclosure generally relates to image processing for calibration. For example, aspects of the present disclosure relate to online intrinsic calibration.

BACKGROUND

Increasingly, systems and devices (e.g., autonomous vehicles, such as autonomous and semi-autonomous cars, drones, mobile robots, mobile devices, extended reality (XR) devices, and other suitable systems or devices) include multiple sensors to gather information about the environment, as well as processing systems to process the information gathered, such as for route planning, navigation, collision avoidance, etc. One example of such a system is an Advanced Driver Assistance System (ADAS) for a vehicle. Sensor data, such as images captured from one or more cameras, may be gathered, transformed, and analyzed to detect objects. Calibration of the cameras is important to ensure accuracy of the sensor data.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems and techniques for online intrinsic calibration. According to at least one example, an apparatus for image processing is provided. The apparatus includes at least one memory and at least one processor coupled to the at least one memory and configured to: obtain, over a duration of time, a plurality of image frames of a three-dimensional (3D) scene, wherein each image frame of the plurality of image frames includes a plurality of two-dimensional (2D) points, and wherein each 2D point of the plurality of 2D points corresponds to a 3D point of a plurality of 3D points in the 3D scene; determine a subset of 3D points based on applying a bundle adjustment algorithm on a set of 3D points of the plurality of 3D points and on fixed parameters of a camera, wherein the set of 3D points are distributed over a field of view of the camera; determine a set of inlier points from the subset of 3D points based on 3D points of the subset of 3D points with a reprojection error less than a threshold value; determine a final subset of 3D points and a final set of parameters of the camera based on applying the bundle adjustment algorithm on the set of inlier points and on a prior set of parameters of the camera; and apply, to the camera, final intrinsic parameters of the final set of parameters of the camera.

In some aspects, a method of image processing is provided. The method includes: obtaining, by a processor over a duration of time, a plurality of image frames of a three-dimensional (3D) scene, wherein each image frame of the plurality of image frames includes a plurality of two-dimensional (2D) points, and wherein each 2D point of the plurality of 2D points corresponds to a 3D point of a plurality of 3D points in the 3D scene; determining, by the processor, a subset of 3D points based on applying a bundle adjustment algorithm on a set of 3D points of the plurality of 3D points and on fixed parameters of a camera, wherein the set of 3D points are distributed over a field of view of the camera; determining, by the processor, a set of inlier points from the subset of 3D points based on 3D points of the subset of 3D points with a reprojection error less than a threshold value; determining, by the processor, a final subset of 3D points and a final set of parameters of the camera based on applying the bundle adjustment algorithm on the set of inlier points and on a prior set of parameters of the camera; and applying, by the processor to the camera, final intrinsic parameters of the final set of parameters of the camera.

In some aspects, a non-transitory computer-readable medium is provided that has stored thereon instructions that, when executed by one or more processors, cause the one or more processors to: obtain, over a duration of time, a plurality of image frames of a three-dimensional (3D) scene, wherein each image frame of the plurality of image frames includes a plurality of two-dimensional (2D) points, and wherein each 2D point of the plurality of 2D points corresponds to a 3D point of a plurality of 3D points in the 3D scene; determine a subset of 3D points based on applying a bundle adjustment algorithm on a set of 3D points of the plurality of 3D points and on fixed parameters of a camera, wherein the set of 3D points are distributed over a field of view of the camera; determine a set of inlier points from the subset of 3D points based on 3D points of the subset of 3D points with a reprojection error less than a threshold value; determine a final subset of 3D points and a final set of parameters of the camera based on applying the bundle adjustment algorithm on the set of inlier points and on a prior set of parameters of the camera; and apply, to the camera, final intrinsic parameters of the final set of parameters of the camera.

In another example, an apparatus for image processing is provided. The apparatus includes: means for obtaining, over a duration of time, a plurality of image frames of a three-dimensional (3D) scene, wherein each image frame of the plurality of image frames includes a plurality of two-dimensional (2D) points, and wherein each 2D point of the plurality of 2D points corresponds to a 3D point of a plurality of 3D points in the 3D scene; means for determining a subset of 3D points based on applying a bundle adjustment algorithm on a set of 3D points of the plurality of 3D points and on fixed parameters of a camera, wherein the set of 3D points are distributed over a field of view of the camera; means for determining a set of inlier points from the subset of 3D points based on 3D points of the subset of 3D points with a reprojection error less than a threshold value; means for determining a final subset of 3D points and a final set of parameters of the camera based on applying the bundle adjustment algorithm on the set of inlier points and on a prior set of parameters of the camera; and means for applying, to the camera, final intrinsic parameters of the final set of parameters of the camera.

Aspects generally include a method, apparatus, system, computer program product, non-transitory computer-readable medium, user device, user equipment, wireless communication device, and/or processing system as substantially described with reference to and as illustrated by the drawings and specification.

In some aspects, each of the apparatuses described above is, can be part of, or can include a mobile device, a smart or connected device, a camera system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes a camera or multiple cameras for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

Some aspects include a device having a processor configured to perform one or more operations of any of the methods summarized above. Further aspects include processing devices for use in a device configured with processor-executable instructions to perform operations of any of the methods summarized above. Further aspects include a non-transitory processor-readable storage medium having stored thereon processor-executable instructions configured to cause a processor of a device to perform operations of any of the methods summarized above. Further aspects include a device having means for performing functions of any of the methods summarized above.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims. The foregoing, together with other features and aspects, will become more apparent upon referring to the following specification, claims, and accompanying drawings.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The preceding, together with other features and embodiments, will become more apparent upon referring to the following specification, claims, and accompanying drawings.

BRIEF DESCRIPTION OF THE DRAWINGS

Illustrative aspects of the present application are described in detail below with reference to the following figures:

FIG. 6 is a block diagram illustrating an example system that may refine keypoints and/or descriptors, in accordance with some examples.

FIG. 10 is a table illustrating an example of a process for bundle adjustment, in accordance with some examples.

FIG. 13 is a diagram illustrating examples of images obtained by different types of cameras that may be utilized for online intrinsic calibration, in accordance with some examples.

FIG. 17 is a flow diagram illustrating an example of a process for online intrinsic calibration, in accordance with some examples.

DETAILED DESCRIPTION

Figure 1A:
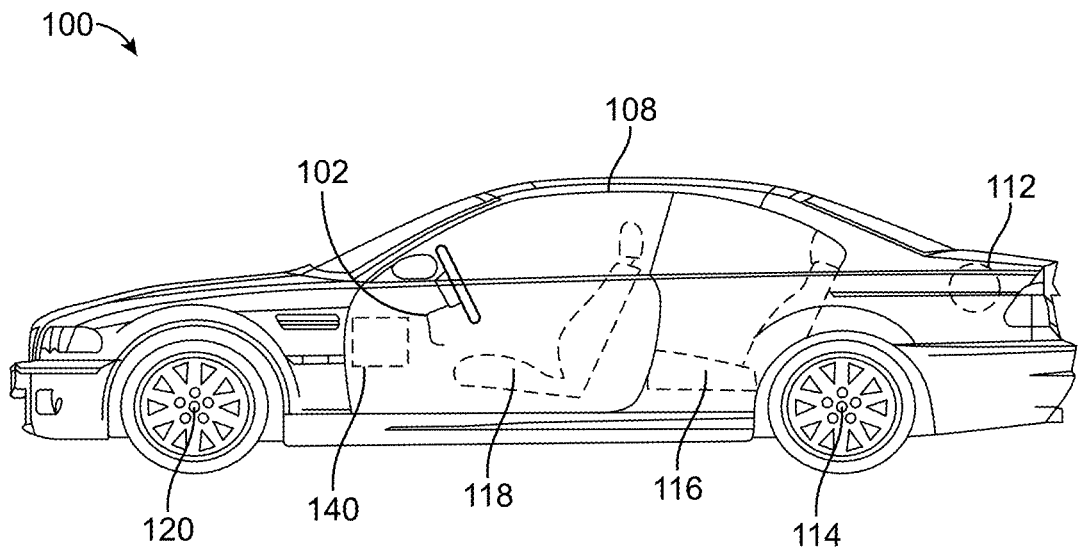
FIGS. 1A and 1B are block diagrams illustrating a vehicle suitable for implementing various techniques described herein, in accordance with aspects of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein can be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

As previously mentioned, increasingly, systems and devices (e.g., autonomous vehicles, such as autonomous and semi-autonomous cars, drones, mobile robots, mobile devices, XR devices, and other suitable systems or devices) include multiple sensors to gather information about the environment, as well as processing systems to process the information gathered, such as for route planning, navigation, collision avoidance, etc. One example of such a system is an ADAS for a vehicle. Sensor data, such as images captured from one or more cameras, may be gathered, transformed, and analyzed to detect objects. Calibration of the cameras is important to ensure accuracy of the sensor data.

In some cases, intrinsic parameters (e.g., focal length and principal point x, y) of cameras implemented within vehicles have been found to vary as a function of ambient temperature or ageing. Considering temperature, parking cameras are often located (e.g., mounted) outside of the vehicle and, as such, are exposed to direct sunlight that can cause heating of components of the cameras (e.g., image sensors, image signal processor (ISP), etc.) and a cold climate of the environment that can cause cooling of the cameras. For some intrinsic parameters, the effect caused by temperature is not the same for different individual cameras. As such, a correction (e.g., calibration) cannot be performed by simply using the measured camera temperature and a feedforward compensation. An estimate of the intrinsic parameters for each individual camera is therefore needed. Currently, there are no known efficient solution in the industry for estimating intrinsic parameters of cameras on a vehicle during normal usage of the vehicle (e.g., online).

As such, improved systems and techniques for online intrinsic calibration can be beneficial.

In one or more aspects, systems, apparatuses, processes (also referred to as methods), and computer-readable media (collectively referred to herein as "systems and techniques") are described herein for providing online intrinsic calibration. In one or more examples, the systems and techniques provide a solution for estimating intrinsic parameters (e.g., focal length and principal point x, y) of a monocular camera mounted on a vehicle. The solution estimates the intrinsic parameters online (e.g., during normal usage of the vehicle), in contrast to calibration procedures performed point-by-point that need to be performed within a manufacturing facility, at a service station, etc. The solution utilizes an algorithm based on bundle adjustment.

Bundle adjustment is the simultaneous refining of 3D coordinates of a scene geometry, the parameters of relative motion, and the optical characteristics (e.g., intrinsic parameters) of a camera used to capture images (e.g., image frames) of the scene (e.g., where the images depict 3D points from different viewpoints of the scene). For bundle adjustment, geometric bundles of rays of light originating from each 3D feature in the scene converge on each camera's optical center, which are adjusted optimally according to an optimality criterion involving corresponding image projections of all of the points.

Bundle adjustment involves minimizing the reprojection error between the image locations of observed and predicted image points, which are expressed as the sum of the squares of nonlinear real-valued functions. This minimization can be achieved by using nonlinear least-squares algorithms (e.g., Levenberg-Marquardt algorithm, which uses a damping strategy that allows for a quick convergence). Bundle adjustment amounts to jointly refining a set of initial camera parameter (e.g., intrinsic parameter) estimates for finding a set of parameters (e.g., intrinsic parameters) that most accurately predict the locations of the observed points in the set of images.

In one or more examples, the systems and techniques perform repeated bundle adjustment using evenly distributed features over a video sequence (e.g., including a plurality of image frames) to determine intrinsic parameters and potential re-calibration for a camera. More specifically, the systems and techniques run a bundle adjustment using initial intrinsic parameters, followed by a bundle adjustment using a common set of input points, and then using a varied inlier subset in subsequent bundle adjustment runs.

In one or more aspects, during operation of the systems and techniques for online intrinsic calibration, a processor, over a duration of time, can obtain a plurality of image frames of a three-dimensional (3D) scene, wherein each image frame of the plurality of image frames can include a plurality of two-dimensional (2D) points, and wherein each 2D point of the plurality of 2D points can correspond to a 3D point of a plurality of 3D points in the 3D scene. The processor can determine a subset of 3D points based on applying a bundle adjustment algorithm on a set of 3D points of the plurality of 3D points and on fixed parameters of a camera, wherein the set of 3D points can be distributed over a field of view (FOV) of the camera. The processor can determine a set of inlier points (e.g., 3D points or 2D points corresponding to projections of the 3D points to the image plane) from the subset of 3D points based on 3D points of the subset of 3D points with a reprojection error less than a threshold value. The processor can determine a final subset of 3D points and a final set of parameters of the camera based on applying the bundle adjustment algorithm on the set of inlier points and on a prior set of parameters of the camera. The processor can apply, to the camera, final intrinsic parameters of the final set of parameters of the camera.

In one or more examples, the set of 3D points can include an initial set of 3D points. In some examples, each 3D point of the initial set of 3D points can correspond to a plurality of 2D points within a track of a plurality a tracks. In one or more examples, each track of the plurality of tracks includes the plurality of 2D points over two or more image frames of the plurality of image frames. In some examples, the plurality of 2D points within a track of the plurality of tracks can have similar features.

In some examples, the camera can be a pinhole camera, a fisheye camera (e.g., with a fisheye lens), or other type of camera. In one or more examples, the set of 3D points of the plurality of 3D points can correspond to 2D points within a subset of image frames of the plurality of image frames. In some examples, the image frames of the subset of image frames can be non-overlapping with each other.

In one or more examples, the fixed parameters of the camera can include view parameters and intrinsic parameters. In some examples, the fixed parameters of the camera can include fixed lens distortion parameters of the camera.

In some examples, the prior set of parameters can include an initial set of parameters of the camera. In one or more examples, the initial set of parameters of the camera can include an initial set of view parameters and an initial set of intrinsic parameters. In some examples, the initial set of intrinsic parameters can include nominal intrinsic values, previously estimated intrinsic values, randomized intrinsic values based on at least one of the nominal intrinsic values or the previously estimated intrinsic values, and/or intrinsic values from a table including the nominal intrinsic values as a function of temperature of the camera. In one or more examples, the camera can be associated with a vehicle, and wherein the initial set of view parameters can be based on a signal of the vehicle and/or visual odometry. In some examples, the signal of the vehicle can include a speed of the vehicle and/or a yaw rate of the vehicle.

In one or more examples, the final set of parameters of the camera can include final view parameters and the final intrinsic parameters. In some examples, the final intrinsic parameters can include a focal length and a principal point for the camera. In one or more examples, the final intrinsic parameters can compensate for a windshield distortion bias affecting the camera and/or a rolling shutter bias affecting the camera.

Additional aspects of the present disclosure are described in more detail below.

Figure 1B:
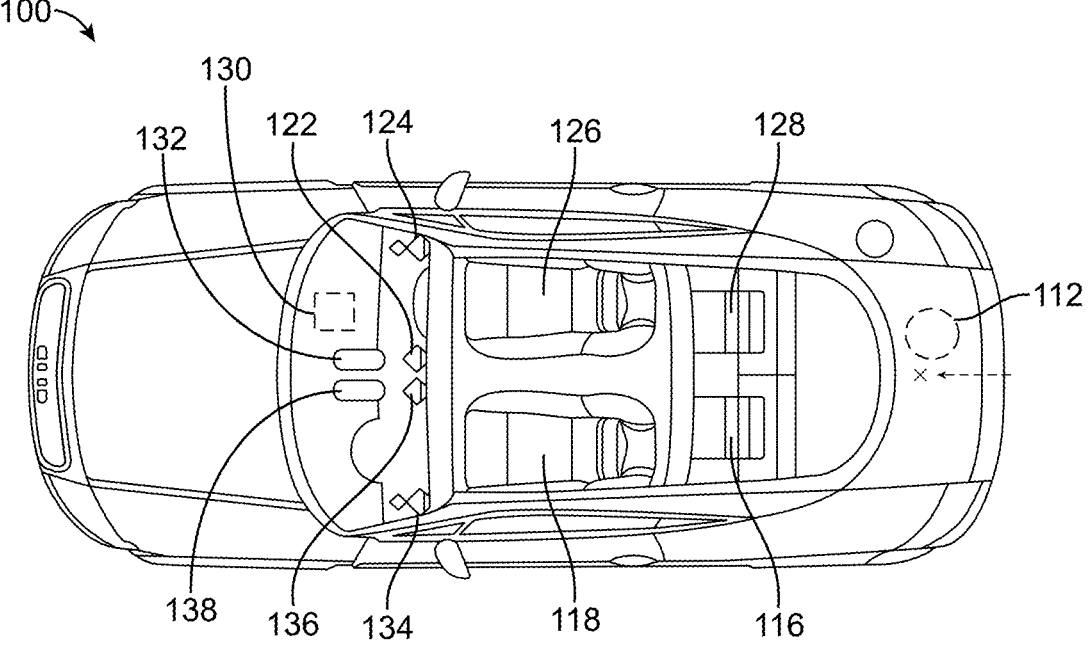

The systems and techniques described herein may be implemented by any type of system or device. One illustrative example of a system that can be used to implement the systems and techniques described herein is a vehicle (e.g., an autonomous or semi-autonomous vehicle) or a system or component (e.g., an ADAS or other system or component) of the vehicle. FIGS. 1A and 1B are diagrams illustrating an example vehicle 100 that may implement the systems and techniques described herein. With reference to FIGS. 1A and 1B, a vehicle 100 may include a control unit 140 and a plurality of sensors 102-138, including satellite geopositioning system receivers (e.g., sensors) 108, occupancy sensors 112, 116, 118, 126, 128, tire pressure sensors 114, 120, cameras 122, 136, microphones 124, 134, impact sensors 130, radar 132, and LIDAR 138. The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation and collision avoidance. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, LIDAR 138, IR sensors, and ultrasonic sensors. The sensors may further include tire pressure sensors 114, 120, humidity sensors, temperature sensors, satellite geopositioning sensors 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle control unit 140 may be configured with processor-executable instructions to perform various embodiments using information received from various sensors, particularly the cameras 122, 136, radar 132, and LIDAR 138. In some embodiments, the control unit 140 may supplement the processing of camera images using distance and relative position information (e.g., relative bearing angle) that may be obtained from radar 132 and/or LIDAR 138 sensors. The control unit 140 may further be configured to control steering, breaking and speed of the vehicle 100 when operating in an autonomous or semi-autonomous mode using information regarding other vehicles determined using various embodiments.

Figure 1C:
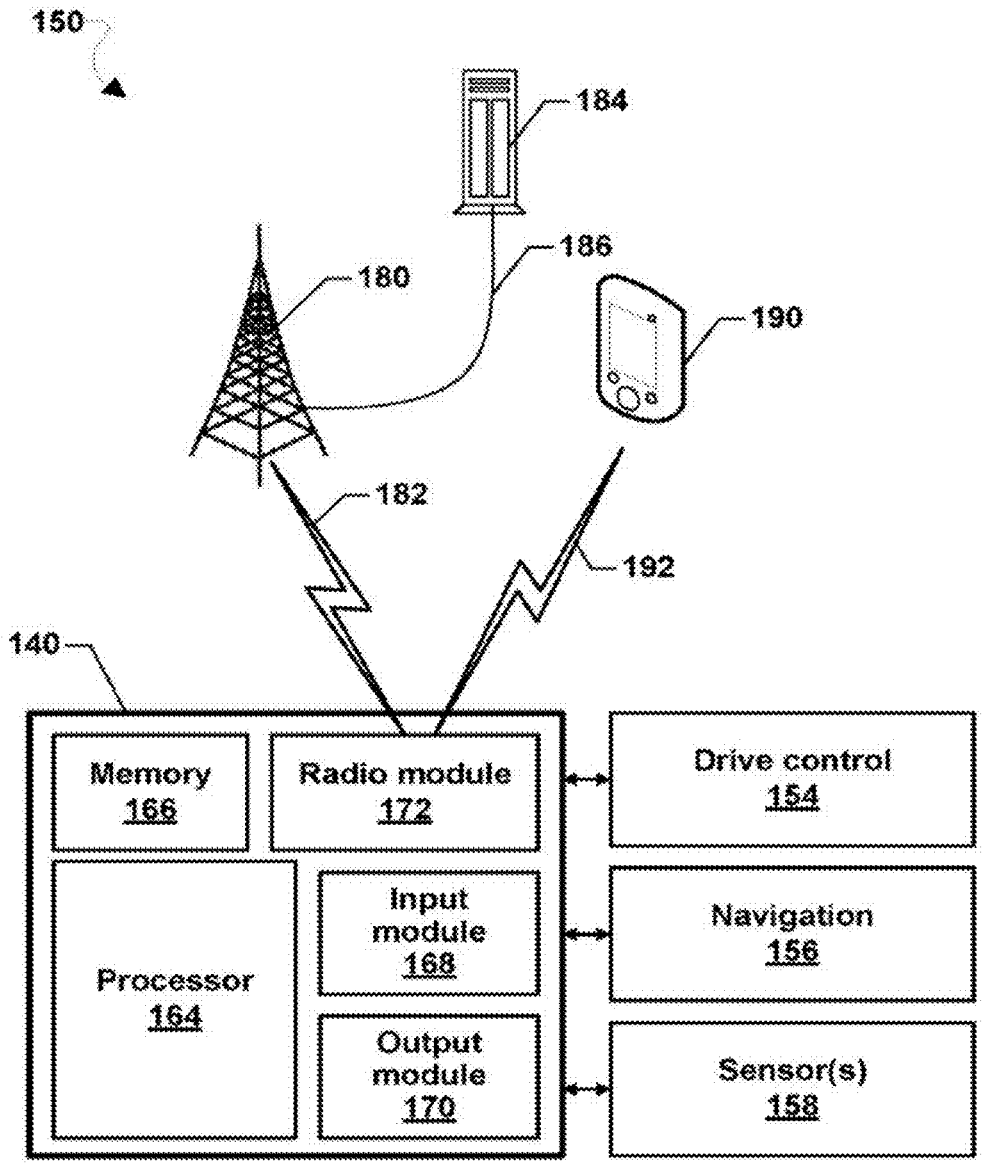
FIG. 1C is a block diagram illustrating components of a vehicle suitable for implementing various techniques described herein, in accordance with aspects of the present disclosure.

FIG. 1C is a component block diagram illustrating a system 150 of components and support systems suitable for implementing various embodiments. With reference to FIGS. 1A, 1B, and 1C, a vehicle 100 may include a control unit 140, which may include various circuits and devices used to control the operation of the vehicle 100. In the example illustrated in FIG. 1C, the control unit 140 includes a processor 164, memory 166, an input module 168, an output module 170 and a radio module 172. The control unit 140 may be coupled to and configured to control drive control components 154, navigation components 156, and one or more sensors 158 of the vehicle 100.

The control unit 140 may include a processor 164 that may be configured with processor-executable instructions to control maneuvering, navigation, and/or other operations of the vehicle 100, including operations of various embodiments. The processor 164 may be coupled to the memory 166. The control unit 140 may include the input module 168, the output module 170, and the radio module 172.

The radio module 172 may be configured for wireless communication. The radio module 172 may exchange signals 182 (e.g., command signals for controlling maneuvering, signals from navigation facilities, etc.) with a network node 180, and may provide the signals 182 to the processor 164 and/or the navigation components 156. In some embodiments, the radio module 172 may enable the vehicle 100 to communicate with a wireless communication device 190 through a wireless communication link 92. The wireless communication link 92 may be a bidirectional or unidirectional communication link and may use one or more communication protocols.

The input module 168 may receive sensor data from one or more vehicle sensors 158 as well as electronic signals from other components, including the drive control components 154 and the navigation components 156. The output module 170 may be used to communicate with or activate various components of the vehicle 100, including the drive control components 154, the navigation components 156, and the sensor(s) 158.

The control unit 140 may be coupled to the drive control components 154 to control physical elements of the vehicle 100 related to maneuvering and navigation of the vehicle, such as the engine, motors, throttles, steering elements, other control elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 156 and may receive data from the navigation components 156. The control unit 140 may be configured to use such data to determine the present position and orientation of the vehicle 100, as well as an appropriate course toward a destination. In various embodiments, the navigation components 156 may include or be coupled to a global navigation satellite system (GNSS) receiver system (e.g., one or more Global Positioning System (GPS) receivers) enabling the vehicle 100 to determine its current position using GNSS signals. Alternatively, or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control components 154, the processor 164 may control the vehicle 100 to navigate and maneuver. The processor 164 and/or the navigation components 156 may be configured to communicate with a server 184 on a network 186 (e.g., the Internet) using wireless signals 182 exchanged over a cellular data network via network node 180 to receive commands to control maneuvering, receive data useful in navigation, provide real-time position reports, and assess other data.

The control unit 140 may be coupled to one or more sensors 158. The sensor(s) 158 may include the sensors 102-138 as described, and may the configured to provide a variety of data to the processor 164.

While the control unit 140 is described as including separate components, in some embodiments some or all of the components (e.g., the processor 164, the memory 166, the input module 168, the output module 170, and the radio module 172) may be integrated in a single device or module, such as a system-on-chip (SOC) processing device. Such an SOC processing device may be configured for use in vehicles and be configured, such as with processor-executable instructions executing in the processor 164, to perform operations of various embodiments when installed into a vehicle.

Figure 1D:
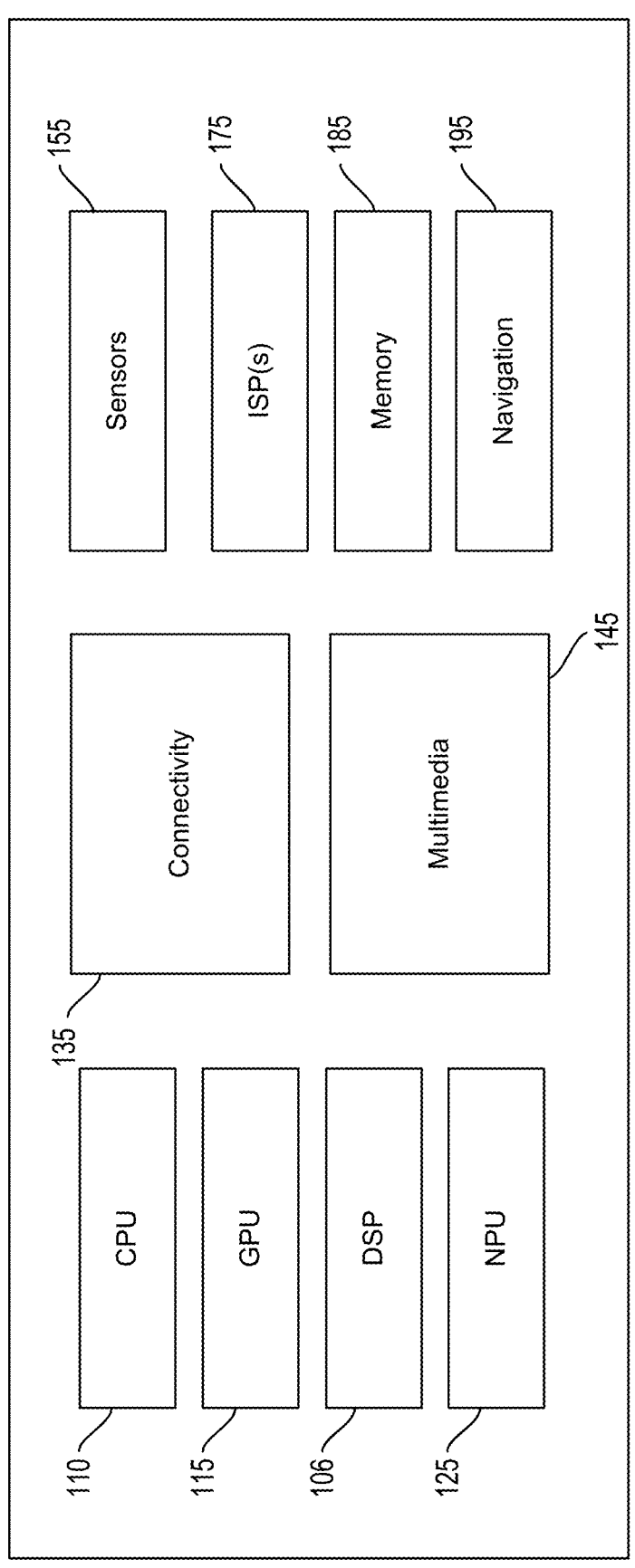
FIG. 1D illustrates an example implementation of a system-on-a-chip (SOC), in accordance with some examples.

FIG. 1D illustrates an example implementation of a system-on-a-chip (SOC) 105, which may include a central processing unit (CPU) 110 or a multi-core CPU, configured to perform one or more of the functions described herein. In some cases, the SOC 105 may be based on an ARM instruction set. In some cases, CPU 110 may be similar to processor 164. Parameters or variables (e.g., neural signals and synaptic weights), system parameters associated with a computational device (e.g., neural network with weights), delays, frequency bin information, task information, among other information may be stored in a memory block associated with a neural processing unit (NPU) 125, in a memory block associated with a CPU 110, in a memory block associated with a graphics processing unit (GPU) 115, in a memory block associated with a digital signal processor (DSP) 106, in a memory block 185, and/or may be distributed across multiple blocks. Instructions executed at the CPU 110 may be loaded from a program memory associated with the CPU 110 or may be loaded from a memory block 185.

The SOC 105 may also include additional processing blocks tailored to specific functions, such as a GPU 115, a DSP 106, a connectivity block 135, which may include fifth generation (5G) connectivity, fourth generation long term evolution (4G LTE) connectivity, Wi-Fi connectivity, USB connectivity, Bluetooth connectivity, and the like, and a multimedia processor 145 that may, for example, detect and recognize gestures. In one implementation, the NPU is implemented in the CPU 110, DSP 106, and/or GPU 115. The SOC 105 may also include a sensor processor 155, image signal processors (ISPs) 175, and/or navigation module 195, which may include a global positioning system. In some cases, the navigation module 195 may be similar to navigation components 156 and sensor processor 155 may accept input from, for example, one or more sensors 158. In some cases, the connectivity block 135 may be similar to the radio module 172.

Figure 2:
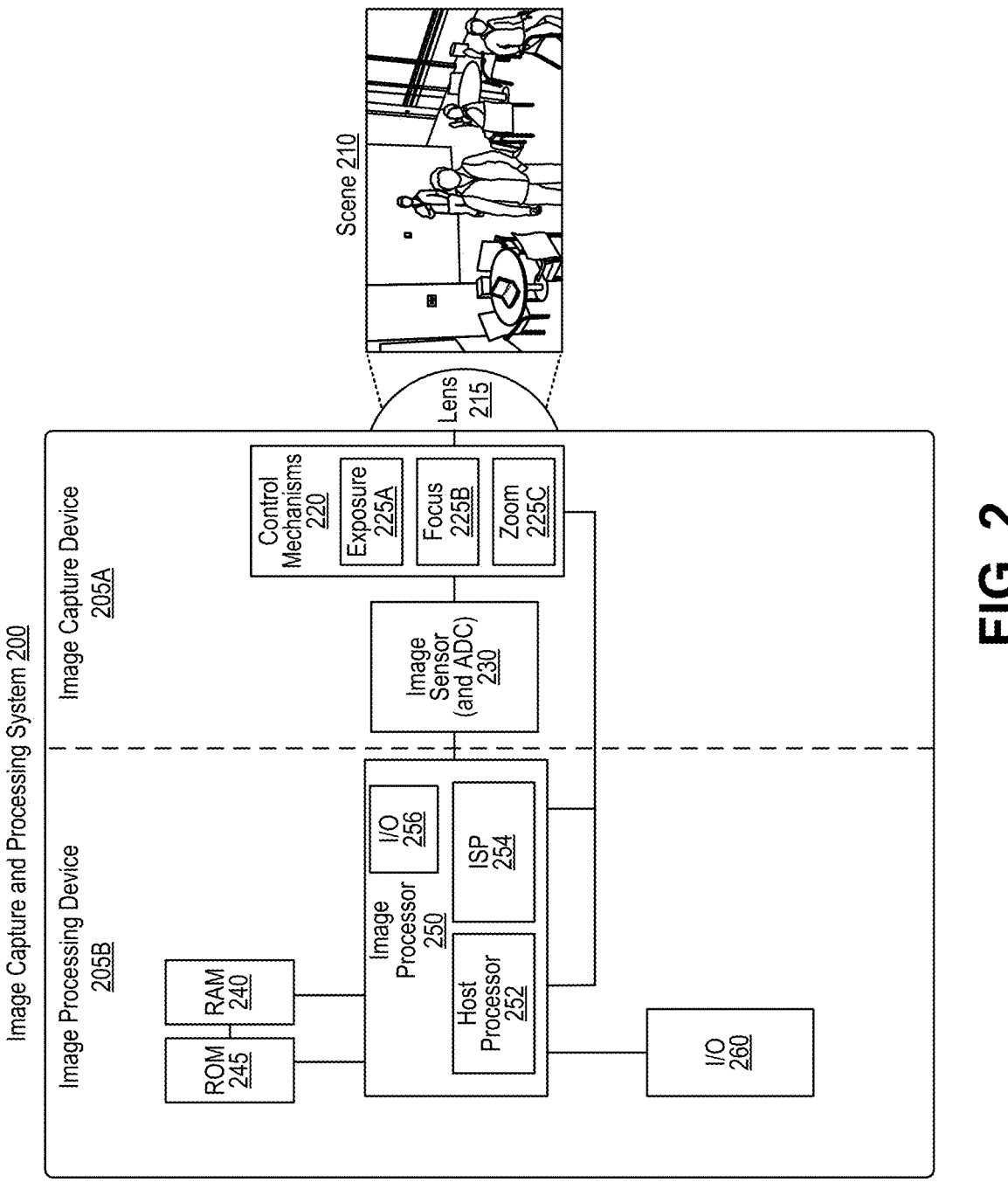
FIG. 2 is a block diagram illustrating an example architecture of an image capture and processing system, in accordance with some examples.

FIG. 2 is a block diagram illustrating an architecture of an image capture and processing system 200. The image capture and processing system 200 includes various components that are used to capture and process images of scenes (e.g., an image of a scene 210). The image capture and processing system 200 can capture standalone images (or photographs) and/or can capture videos that include multiple images (or video frames) in a particular sequence. A lens 215 of the system 200 faces a scene 210 and receives light from the scene 210. The lens 215 bends the light toward the image sensor 230. The light received by the lens 215 passes through an aperture controlled by one or more control mechanisms 220 and is received by an image sensor 230.

The one or more control mechanisms 220 may control exposure, focus, and/or zoom based on information from the image sensor 230 and/or based on information from the image processor 250. The one or more control mechanisms 220 may include multiple mechanisms and components; for instance, the control mechanisms 220 may include one or more exposure control mechanisms 225A, one or more focus control mechanisms 225B, and/or one or more zoom control mechanisms 225C. The one or more control mechanisms 220 may also include additional control mechanisms besides those that are illustrated, such as control mechanisms controlling analog gain, flash, HDR, depth of field, and/or other image capture properties.

The focus control mechanism 225B of the control mechanisms 220 can obtain a focus setting. In some examples, focus control mechanism 225B store the focus setting in a memory register. Based on the focus setting, the focus control mechanism 225B can adjust the position of the lens 215 relative to the position of the image sensor 230. For example, based on the focus setting, the focus control mechanism 225B can move the lens 215 closer to the image sensor 230 or farther from the image sensor 230 by actuating a motor or servo, thereby adjusting focus. In some cases, additional lenses may be included in the system 200, such as one or more microlenses over each photodiode of the image sensor 230, which each bend the light received from the lens 215 toward the corresponding photodiode before the light reaches the photodiode. The focus setting may be determined via contrast detection autofocus (CDAF), phase detection autofocus (PDAF), or some combination thereof. The focus setting may be determined using the control mechanism 220, the image sensor 230, and/or the image processor 250. The focus setting may be referred to as an image capture setting and/or an image processing setting.

The exposure control mechanism 225A of the control mechanisms 220 can obtain an exposure setting. In some cases, the exposure control mechanism 225A stores the exposure setting in a memory register. Based on this exposure setting, the exposure control mechanism 225A can control a size of the aperture (e.g., aperture size or f/stop), a duration of time for which the aperture is open (e.g., exposure time or shutter speed), a sensitivity of the image sensor 230 (e.g., ISO speed or film speed), analog gain applied by the image sensor 230, or any combination thereof. The exposure setting may be referred to as an image capture setting and/or an image processing setting.

The zoom control mechanism 225C of the control mechanisms 220 can obtain a zoom setting. In some examples, the zoom control mechanism 225C stores the zoom setting in a memory register. Based on the zoom setting, the zoom control mechanism 225C can control a focal length of an assembly of lens elements (lens assembly) that includes the lens 215 and one or more additional lenses. For example, the zoom control mechanism 225C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 215 in some cases) that receives the light from the scene 210 first, with the light then passing through an afocal zoom system between the focusing lens (e.g., lens 215) and the image sensor 230 before the light reaches the image sensor 230. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 225C moves one or more of the lenses in the afocal zoom system, such as the negative lens and one or both of the positive lenses.

The image sensor 230 includes one or more arrays of photodiodes or other photosensitive elements. Each photodiode measures an amount of light that eventually corresponds to a particular pixel in the image produced by the image sensor 230. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 230 may alternately or additionally include opaque and/or reflective masks that block light from reaching certain photodiodes, or portions of certain photodiodes, at certain times and/or from certain angles, which may be used for phase detection autofocus (PDAF). The image sensor 230 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 220 may be included instead or additionally in the image sensor 230. The image sensor 230 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 250 may include one or more processors, such as one or more image signal processors (ISPs) (including ISP 254), one or more host processors (including host processor 252), and/or one or more of any other type of processor 1810 discussed with respect to the computing system 1800. The host processor 252 can be a digital signal processor (DSP) and/or other type of processor. In some implementations, the image processor 250 is a single integrated circuit or chip (e.g., referred to as a system-on-chip or SoC) that includes the host processor 252 and the ISP 254. In some cases, the chip can also include one or more input/output ports (e.g., input/output (I/O) ports 256), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 256 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 252 can communicate with the image sensor 230 using an I2C port, and the ISP 254 can communicate with the image sensor 230 using an MIPI port.

The image processor 250 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 250 may store image frames and/or processed images in random access memory (RAM) 240/1825, read-only memory (ROM) 245/1820, a cache 1812, a memory unit (e.g., system memory 1815), another storage device 1830, or some combination thereof.

Various input/output (I/O) devices 260 may be connected to the image processor 250. The I/O devices 260 can include a display screen, a keyboard, a keypad, a touchscreen, a trackpad, a touch-sensitive surface, a printer, any other output devices 1835, any other input devices 1845, or some combination thereof. In some cases, a caption may be input into the image processing device 205B through a physical keyboard or keypad of the I/O devices 260, or through a virtual keyboard or keypad of a touchscreen of the I/O devices 260. The I/O 260 may include one or more ports, jacks, or other connectors that enable a wired connection between the system 200 and one or more peripheral devices, over which the system 200 may receive data from the one or more peripheral device and/or transmit data to the one or more peripheral devices. The I/O 260 may include one or more wireless transceivers that enable a wireless connection between the system 200 and one or more peripheral devices, over which the system 200 may receive data from the one or more peripheral device and/or transmit data to the one or more peripheral devices. The peripheral devices may include any of the previously-discussed types of I/O devices 260 and may themselves be considered I/O devices 260 once they are coupled to the ports, jacks, wireless transceivers, or other wired and/or wireless connectors.

In some cases, the image capture and processing system 200 may be a single device. In some cases, the image capture and processing system 200 may be two or more separate devices, including an image capture device 205A (e.g., a camera) and an image processing device 205B (e.g., a computing device coupled to the camera). In some implementations, the image capture device 205A and the image processing device 205B may be coupled together, for example via one or more wires, cables, or other electrical connectors, and/or wirelessly via one or more wireless transceivers. In some implementations, the image capture device 205A and the image processing device 205B may be disconnected from one another.

As shown in FIG. 2, a vertical dashed line divides the image capture and processing system 200 of FIG. 2 into two portions that represent the image capture device 205A and the image processing device 205B, respectively. The image capture device 205A includes the lens 215, control mechanisms 220, and the image sensor 230. The image processing device 205B includes the image processor 250 (including the ISP 254 and the host processor 252), the RAM 240, the ROM 245, and the I/O 260. In some cases, certain components illustrated in the image capture device 205A, such as the ISP 254 and/or the host processor 252, may be included in the image capture device 205A.

The image capture and processing system 200 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 200 can include one or more wireless transceivers for wireless communications, such as cellular network communications, 802.11 wi-fi communications, wireless local area network (WLAN) communications, or some combination thereof. In some implementations, the image capture device 205A and the image processing device 205B can be different devices. For instance, the image capture device 205A can include a camera device and the image processing device 205B can include a computing device, such as a mobile handset, a desktop computer, or other computing device.

While the image capture and processing system 200 is shown to include certain components, one of ordinary skill will appreciate that the image capture and processing system 200 can include more components than those shown in FIG. 2. The components of the image capture and processing system 200 can include software, hardware, or one or more combinations of software and hardware. For example, in some implementations, the components of the image capture and processing system 200 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 200.

The host processor 252 can configure the image sensor 230 with new parameter settings (e.g., via an external control interface such as I2C, I3C, SPI, GPIO, and/or other interface). In one illustrative example, the host processor 252 can update exposure settings used by the image sensor 230 based on internal processing results of an exposure control algorithm from past image frames. The host processor 252 can also dynamically configure the parameter settings of the internal pipelines or modules of the ISP 254 to match the settings of one or more input image frames from the image sensor 230 so that the image data is correctly processed by the ISP 254. Processing (or pipeline) blocks or modules of the ISP 254 can include modules for lens (or sensor) noise correction, de-mosaicing, color conversion, correction or enhancement/suppression of image attributes, denoising filters, sharpening filters, among others. Each module of the ISP 254 may include a large number of tunable parameter settings. Additionally, modules may be co-dependent as different modules may affect similar aspects of an image. For example, denoising and texture correction or enhancement may both affect high frequency aspects of an image. As a result, a large number of parameters are used by an ISP to generate a final image from a captured raw image.

In some cases, the image sensor 230 can support dynamic switching between different operational modes that the image sensor 230 supports. Examples of the different operation modes include power off mode, software standby mode, stream on and off mode, among others. For instance, in stream operation mode, the image sensor is fully powered. With the stream operation on, the image sensor starts streaming image data (e.g., on the CSI-2 PHY layer port or interface). With the stream operation off, the image sensor stops streaming image data. In some cases, the host processor 252 can perform a dynamic parameter reconfiguration process that allows the image sensor 230 to support dynamic switching between the different operational modes without going through stream on and off and/or software standby procedures. Dynamic parameter reconfiguration refers to a process performed by the host processor 252 (e.g., an AP or other processor) to configure and update sensor internal register settings on-the-fly (e.g., as the operational modes change) without powering off the image sensor 230 and then powering on or putting the image sensor 230 into a software standby mode. Software standby mode refers to an operational mode of the image sensor 230 where the image sensor 230 is powered on and the camera control interface (CCI) communication is operational, but the image sensor 230 cannot capture and stream image data (e.g., on the CSI bus).

Such dynamic switching can reduce latency of mode switching processing and can improve user experience. Examples of the image sensor 230 dynamically switching between different operational modes include switching between turning high dynamic range (HDR) on and off, switching between a different number of exposures, switching between turning binning on and off (e.g., generating a 12 megapixel (MP) image using a 2×2 Quad Color Filter Array (QCFA) when binning is on and generating a 48 MP image by remosaicing the QCFA to a Bayer color filter array (CFA) when binning is off), among others.

Switching between operational modes (referred to as mode-switching scenarios) is different than changing image capture settings (referred to as non-mode-switching scenarios). For example, modifying image capture settings (e.g., exposure, focus, etc.) can result in a modification of how an image is captured and/or processed by the image sensor 230 and/or the ISP 254 (e.g., resulting in a brighter image, an image with a particular object in focus, etc.). However, if a setting of the image sensor 230 is incorrect or the image sensor 230 and/or ISP 254 are late in applying a setting in a non-mode-switching scenario, the result will be that a captured image is captured and/or processed with slight loss of quality in the processed image (e.g., without the intended settings, such as the image being slightly darker than intended, with an object slightly more out of focus than intended, etc.). However, when switching between operational modes in a mode-switching scenario (e.g., from HDR off to HDR on), applying the incorrect settings can result in a system failure, such as system hang or freeze, which can require a hardware reset of the ISP 254 and/or other components of the image capture and processing system 200. For instance, if the ISP 254 is unaware of the correct settings of an image frame produced by the image sensor 230 and mistakenly applies erroneous settings or parameters on that image frame for internal pipeline processing, the ISP 254 may freeze and require a hardware reset. As a result, instead of outputting an image frame with reduced quality, the image capture and processing system 200 may have to temporarily shut down and restart (e.g., the display screen may show a blank screen while the system 200 resets).

Figure 3:
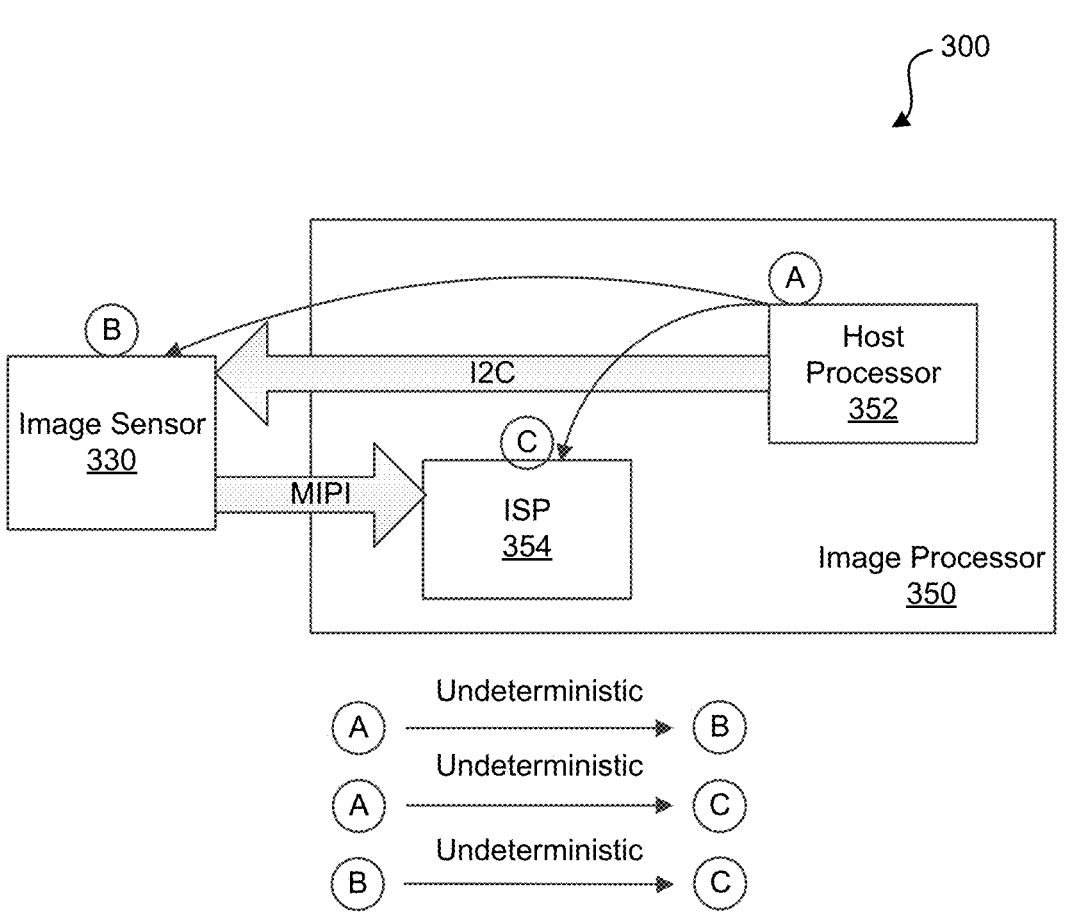
FIG. 3 is a block diagram illustrating an example of interactions between components of an image capture and processing system, in accordance with some examples.

Synchronization between the image sensor 230 and the ISP 254 is important in order to provide an operational image capture system that generates high quality images without interruption and/or failure. FIG. 3 is a block diagram illustrating an example of an image capture and processing system 300 including an image processor 350 (including host processor 352 and ISP 354) in communication with an image sensor 330. The configuration shown in FIG. 3 is illustrative of traditional synchronization techniques used in camera systems. In general, the host processor 352 attempts to provide synchronization between the image sensor 330 and the ISP 354 using fixed periods of time by separately communicating with the image sensor 330 and the ISP 354. For example, in traditional camera systems, the host processor 352 communicates with the image sensor 330 (e.g., over an I2C port) and programs the image sensor 330 parameters with a first fixed period of time, such as 2-frame periods ahead of when that image frame will be processed by the ISP 354. The host processor 352 communicates with the ISP 354 (e.g., over an internal AHB bus or other interface) and programs the ISP 354 parameter settings with a second fixed period of time, such as 1-frame period ahead of when that image frame will be processed by the ISP 354.

The image sensor 330 can send image frames to the ISP 354 (B-to-C in FIG. 3), such as over an MIPI CSI-2 PHY port or interface, or other suitable interface. However, the communication between the host processor 352 and the image sensor 330 (shown as from A to B) is undeterministic. Similarly, the communication between the image sensor 330 and the ISP 354 (shown as from B to C) and the communication the host processor 352 and the ISP 354 (shown as from A to C) are also undeterministic. For example, there can be varying latencies in programming of the image sensor 330 and the ISP 354 by the host processor 352, which can result in a parameter settings mismatch between the sensor and the ISP. The latencies can be due to high CPU usage, congestion in one or more I/O ports, and/or due to other factors.

Many computer-vision tasks may rely on keypoints determined from images. There are various techniques for generating keypoints, such as scale-invariant feature transform (SIFT), speeded-up robust features (SURF), features from accelerated segment test (FAST), binary robust independent elementary feature (BRIEF), and oriented FAST and rotated BRIEF (ORB).

Figure 4:
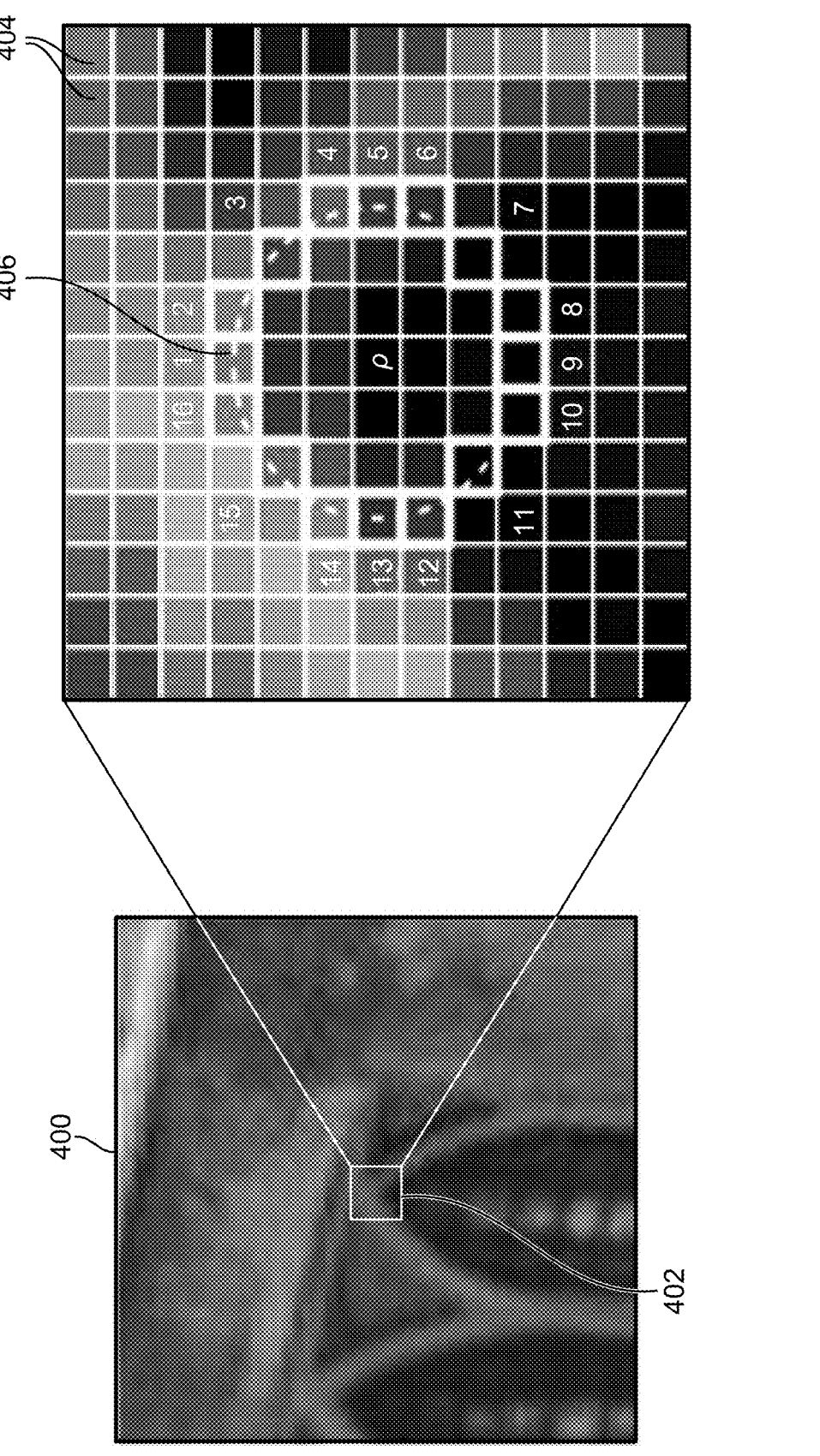
FIG. 4 is a diagram illustrating an example of an image including a keypoint, in accordance with some examples.

FIG. 4 is a diagram illustrating an example of an image 400 including a keypoint p according to various aspects of the present disclosure. Keypoint p is surrounded by a window 402 of pixels 404 in the image 400. Keypoint p may be selected such that keypoint p can be matched between images. For example, Keypoint p may be visually distinct in image 400. Keypoint p may be, as an example, a corner point on an object. In the art a keypoint may be alternatively referred to as a visual feature, a point of interest or a key point. An example keypoint-detection method is described with regard to FIG. 4. In particular, FIG. 4 illustrates the Features from Accelerated Segment Test (FAST) technique (Machine Learning for High-Speed Corner Detection, Edward Rosten & Tom Drummond, ECCV 2006: Computer Vision ECCV 2006 pp 430-443, Part of the Lecture Notes in Computer Science book series (LNIP, volume 3951)). In the FAST method, a pixel under test (e.g., pixel p) with intensity Ip may be identified as an interest point. A circle 406 of sixteen pixels (pixels 1-16) around the pixel under test p (e.g., a Bresenham circle of radius 3) may then be identified. The pixel under test p may be considered a keypoint if there exists a set of n contiguous pixels in circle 406 of sixteen pixels that are all brighter than Ip+t, or all darker than Ip−t, where t is a threshold value and n is configurable. In this example, n may be twelve. For example, the intensity of pixels 1, 5, 9, and 13 of the circle may be compared with Ip. If at least three of the four pixels do not satisfy the threshold criteria, the pixel p is not considered an interest point. As can be seen in FIG. 4, at least three of the four pixels satisfy the threshold criteria. Therefore, all sixteen pixels may be compared to pixel p to determine if twelve contiguous pixels meet the threshold criteria. This process may be repeated for each of pixels 404 in the image 400 to identify the corner points corresponding to keypoint p in image 400.

Although FIG. 4 illustrates a FAST keypoint-identifying method, it should be understood that the present disclosure is applicable to any keypoint-identifying method. Examples of keypoint-identifying methods may include, but are not limited to, speeded-up robust features (SURF), scale-invariant feature transform (SIFT), binary robust independent elementary feature (BRIEF), oriented FAST and rotated BRIEF (ORB), and Harris corner point. Furthermore, keypoints can also be generated by Deep Neural Networks (DNN).

As indicated above, a keypoint p represents a feature of an image 400 that may be matched between multiple images of a scene (e.g., captured from different viewing angles and/or with different intrinsic camera parameters). For example, various cross-correlation or optical flow methods may match features (keypoints) across multiple images. In some examples, each feature may further include a feature descriptor that assists with the matching process. A feature descriptor may summarize, in vector format (e.g., of constant length) one or more characteristics of pixels 404 of window 402. For example, the feature descriptor may correspond to the intensity of pixels 404 of window 402. As another example, the feature descriptor may correspond to pixels within a threshold distance of keypoint p. For instance, the feature descriptor may correspond to all pixels within 6 pixels above, to the right of, below, and/or to the right of pixel p. In general, feature descriptors are independent of the positions of keypoint p, robust against image transformations, and scale independently. Thus, keypoints with feature descriptors may be independently re-detected in each image frame and then subjected to a keypoint matching/tracking procedure. For example, the keypoints in two different images with matching descriptors and the smallest distance between them may be considered to be matching keypoints. Examples of feature-descriptor methods may include, but are not limited to, ORB, SURF, and BRIEF.

A relative pose of two cameras (or of one camera at two times) may be calculated based on the two-dimensional displacement of a plurality of keypoints in images from each of the cameras (or in images captured by the one camera at the two times). For example, the pose may be determined by forming and factoring an essential matrix using eight keypoints or using Nister's method with five keypoints. As another example, a Perspective-n-Point (PnP) algorithm with three keypoints may be used to determine the pose if keypoint depth is also being tracked. In some aspects, images captured by different cameras (e.g., of different devices or vehicles) that contain a minimum number of the same features (e.g., based on the pose determination method) may be used to determine the relative pose between the cameras.

Figure 5:
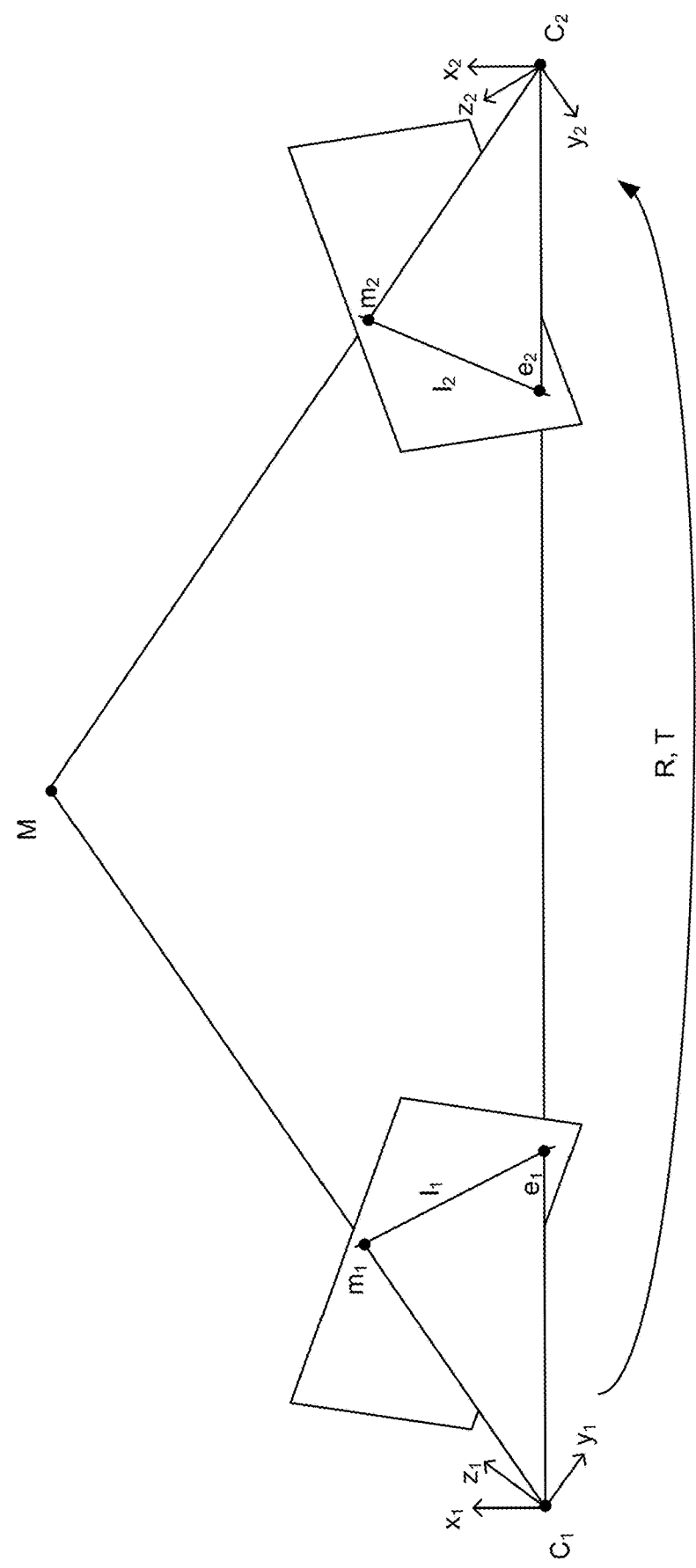
FIG. 5 is a diagram illustrating an example of relative pose determination using points of interest from images captured at different cameras, in accordance with some examples.

FIG. 5 is a diagram illustrating an example of relative pose determination using keypoints from images captured at different cameras C1 and C2 according to various aspects of the present disclosure. In the example shown in FIG. 5, each of the cameras C1 and C2 may be positioned on a different device, such as an extended reality (XR) device, a mobile device, a vehicle, or a roadside unit. A real point M in three-dimensional space (x, y, z) may be projected onto the respective image planes I1 and I2 of each of the vehicle cameras C1 and C2 to produce features (keypoints) m1 and m2. By correlating or associating (e.g., matching) multiple sets of features (e.g., corresponding to multiple real points), the epipolar constraint (e.g., line I1 between m1 and e1 and line I2 between m2 and e2) on the relative vehicle pose may be extracted. As a result, based on the keypoints of multiple real points and the epipolar constraint, a first device associated with camera C1 may determine the relative pose (Rotation (R), Translation (T)) of the first device with respect to a second device associated with camera C2. If the location of one camera C1 or camera C2 (in a global coordinate system) is known, the relative pose may be used to determine the location of the other of the cameras (in the global coordinate system).

The same principles apply to determining a change in a pose of a single camera between a first time and a second time. For example, at a first time the camera may be at the position of C1 and may capture I1. At a second time, the camera may be at the position of C2 and may capture I2. A device including the camera may determine the change in pose between the first time and the second time as described above.

FIG. 6 is a block diagram illustrating an example system 600 that may refine keypoints 602 and/or descriptors 604, according to various aspects of the present disclosure. For example, system 600 includes feature refinement network

606. Feature refinement network 606 may obtain keypoints 602 and descriptors 604, refine keypoints 602 to generate refined keypoints 608, and/or refine descriptors 604 to generate refined descriptors 610.

Keypoints 602 may be, or may include, image coordinates of keypoints of an image. For example, keypoint p of FIG. 4 may be an example of one of keypoints 602.

Descriptors 604 may be, or may include, vectors of values describing keypoints 602. Descriptors 604 may include a vector of values corresponding to each one of keypoints 602. Using keypoint p of FIG. 4 as an example one of keypoints 602, descriptors 604 may include a vector of values based on pixels 404 of window 402. The vectors of values may include any number of values for each keypoint of keypoints 602.

Feature refinement network 606 may be, or may include, one or more machine-learning models trained to refine keypoints and/or descriptors. For example, feature refinement network 606 may be trained through an iterative backpropagation process.

For example, a corpus of training data may be obtained. The corpus of training data my include sets of keypoints, descriptors, refined keypoints, and refined descriptors. During the training procedure, feature refinement network 606 may be provided with keypoints and corresponding descriptors derived from an image. Feature refinement network 606 may adjust the keypoints and the descriptors. The adjusted keypoints and descriptors may be compared with refined keypoints and refined descriptors of the training data. A loss (or "error") may be determined based on differences between the keypoints and descriptors adjusted by feature refinement network 606 and the refined keypoints and refined descriptors of the training data. Additionally or alternatively, the loss may be determined based on successes in matching the adjusted keypoints with keypoints of the training data based on the descriptors. Parameters (e.g., weights) of feature refinement network 606 may be adjusted based on the loss to decrease the loss in future iterations of the iterative training process, for example, according to a gradient descent loss-minimization technique.

In some aspects, feature refinement network 606 may be trained in an end-to-end training process with a consumer of refined keypoints and/or refined descriptors. For example, the corpus of training data may be, or may include, sets of keypoints, descriptors, and outputs of the consumer. For instance, the consumer may be a 6DoF-pose determiner that may output pose information. The training data may include sets of keypoints, descriptors, and pose information. During the training procedure, the keypoints and descriptors may be provided to feature refinement network 606. Feature refinement network 606 may adjust the keypoints and descriptors and provided the adjusted keypoints and descriptors to the consumer. The consumer may generate outputs based on the adjusted keypoints and descriptors. The outputs may be compared with outputs of the training data and a loss may be determined based on a difference between the outputs and the outputs of the training data. Parameters (e.g., weights) of feature refinement network 606 (and/or of the consumer) may be adjusted based on the loss to decrease the loss in future iterations of the iterative training process, for example, according to a gradient descent loss-minimization technique.

Refined keypoints 608 may be, or may include, image coordinates of the keypoints of the image. Refined keypoints 608 may be based on keypoints 602 and may include one refined keypoint corresponding to each one of keypoints 602. Refined keypoints 608 may have a sub-pixel resolution.

For example, whereas keypoints 602 may be image coordinates with a pixel-level resolution, refined keypoints 608 may have a sub-pixel resolution. For example, keypoints 602 may include a keypoint (3, 4) which may indicate a pixel that is at 3 pixels in an x direction and 4 pixels in a y direction. Refined keypoints 608 may include a refined keypoint (2.9, 4.3) which indicates a point in the image that has a sub-pixel resolution.

Refined descriptors 610 may be, or may include, vectors of values describing refined keypoints 608. Refined descriptors 610 may include a vector of values corresponding to each one of refined keypoints 608. Refined descriptors 610 may be robust. For example, refined descriptors 610 may be used by a consumer to match with keypoints from an image captured from a different viewing angle. Additionally or alternatively, refined descriptors 610 may be used to match despite refined descriptors 610 being based on an image captured in harsh weather conditions (e.g., rain, snow, or fog).

In order to generate robust of descriptors, feature refinement network 606 may be trained using sets of images captured from various viewing angles, sets of images adjusted according to various transformations (e.g., a homography), and/or sets of images captured under different weather conditions (or simulated as if the images were captured under different weather conditions). For example, in several iterations of a training process, keypoints and descriptors based on a baseline image may be provided to feature refinement network 606 and feature refinement network 606 may generate adjusted keypoints and descriptors. The keypoints and descriptors based on the baseline image may include various keypoints and descriptors based on one or more of: a rotated version of the baseline image, a translated version of the baseline image, a skewed version of the baseline image, a version of the baseline image with added noise, and/or a version of the baseline image under simulated weather conditions. Losses may be determined based on how well the adjusted keypoints generated by feature refinement network 606 are matched to keypoints of the training data. For example, feature refinement network 606 may be provided with keypoints and descriptors based on a transformed version of a baseline image. Feature refinement network 606 may generate adjusted keypoints and descriptors based on the transformed version of the baseline image. The adjusted keypoints may be matched with keypoints based on the baseline image. A loss may be determined based on how well the adjusted keypoints are matched with the keypoints based on the baseline image. Feature refinement network 606 may be adjusted based on the loss.

In some aspects, feature refinement network 606 may generate refined keypoints 608 and refined descriptors 610 based on keypoints 602 and descriptors 604. In some aspects, feature refinement network 606 may generate refined keypoints 608 and refined descriptors 610 based on keypoints 602, descriptors 604, and image information 612. Image information 612 may include information related to pixels on which refined descriptors 610 may be generated. For example, image information 612 may include values of pixels proximate to keypoints 602. Using keypoint p of FIG. 4 as an example, image information 612 may include values of one or more of pixels 404 of window 402. In some aspects, keypoints 602 and/or descriptors 604 may include values of pixels proximate to keypoints, for example, as metadata.

Feature refinement network 606 may be included as a module in another system. For example, feature refinement network 606 may be included in a computer-vision system and may be used to refine keypoints and descriptors.

Figure 7:
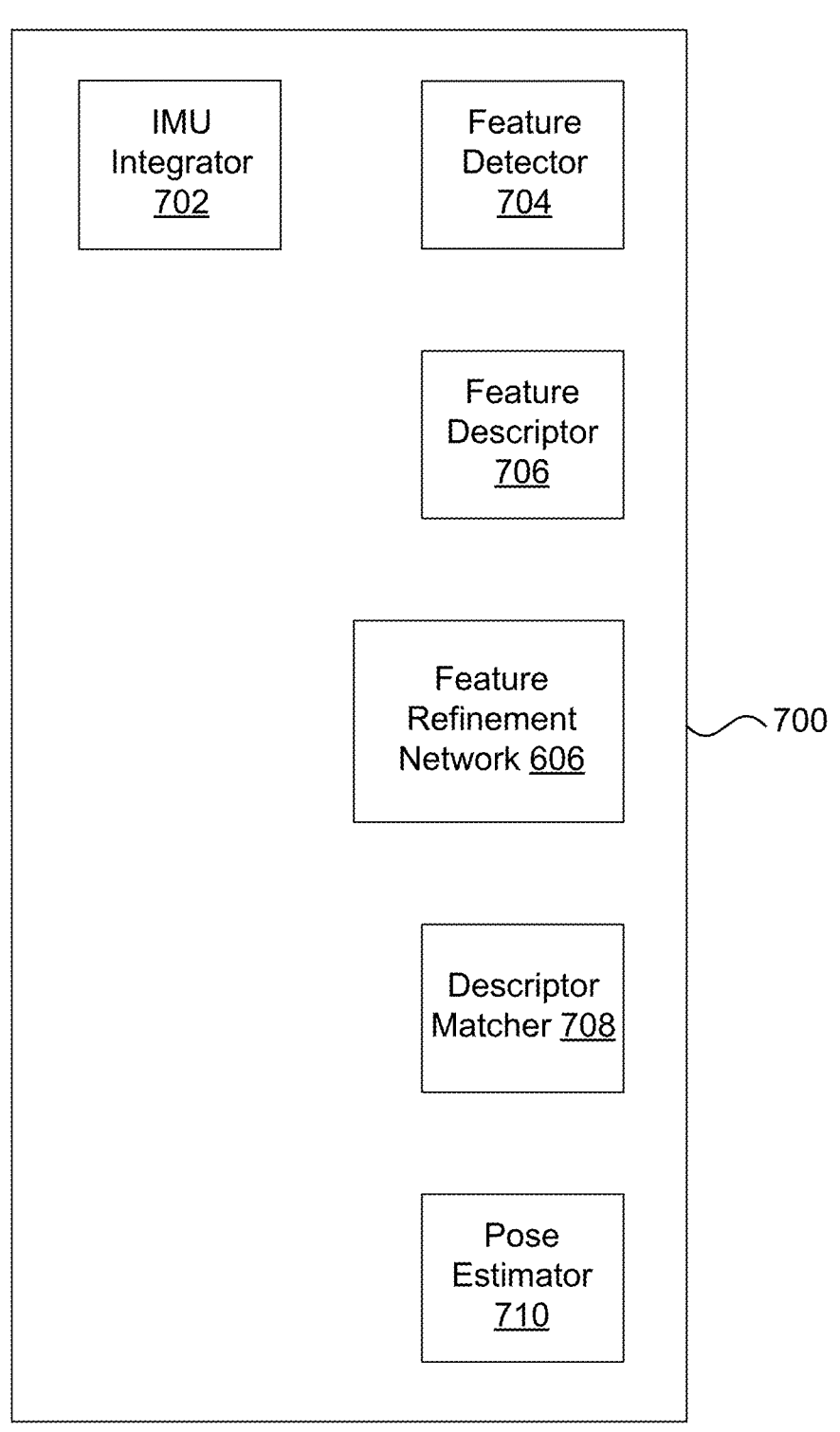
FIG. 7 is a block diagram illustrating an example system that may include feature refinement network to refine keypoints and/or descriptors, in accordance with some examples.

For example, FIG. 7 is a block diagram illustrating an example system 700 that may include feature refinement network 606 to refine keypoints and/or descriptors, according to various aspects of the present disclosure. For instance, system 700 may be a pose estimator included in a display (e.g., a head-mounted display (HMD)) of an extended reality (XR) system. System 700 may receive motion data from one or more inertial measurement units (IMUs) and an IMU integrator 702 that may collect and integrate motion data from the IMUs. System 700 may also receive image data from one or more cameras that may capture images. Feature detector 704 of system 700 may generate features (e.g., keypoints) based on the images and feature descriptor 706 may generate descriptors of the features. Feature refinement network 606 may be a module implemented in system 700 to refine the keypoints and/or descriptors. Feature refinement network 606 may generate refined keypoints and/or refined descriptors. Descriptor matcher 708 of system 700 may match refined keypoints between images (based on the refined descriptors) and pose estimator 710 may determine a pose of the cameras which captured the images (and/or of a device that includes the cameras) based on the keypoints matched between the images and/or based on motion data from IMU integrator 702.

Because feature refinement network 606 may refine the keypoints and/or the descriptors (e.g., generating robust descriptors), descriptor matcher 708 may be enabled to better match keypoints between images that are captured from different viewing angles. Thus, feature refinement network 606 may improve the overall operation of system 700.

As previously mentioned, increasingly, systems and devices (e.g., autonomous vehicles, such as autonomous and semi-autonomous cars, drones, mobile robots, mobile devices, XR devices, and other suitable systems or devices) include multiple sensors to gather information about the environment, as well as processing systems to process the information gathered (e.g., for route planning, navigation, collision avoidance, etc). One example of such a system is an ADAS for a vehicle. Sensor data (e.g., images captured from one or more cameras) may be gathered, transformed, and analyzed to detect objects. Calibration of the cameras is important to ensure accuracy of the sensor data.

In some examples, intrinsic parameters (e.g., focal length and principal point x, y) of cameras implemented within vehicles have been found to vary as a function of ambient temperature and ageing. When considering temperature, parking cameras are often located (e.g., mounted) outside of the vehicle and, thus, are exposed to direct sunlight that can cause heating of the cameras and a cold climate of the environment that can cause cooling of the cameras. For some intrinsic parameters, the effect caused by temperature is not the same for different individual cameras. As such, a correction (e.g., calibration) cannot be performed by simply using the measured camera temperature and a feedforward compensation. An estimate of the intrinsic parameters for each individual camera is thus needed. There are, currently, no known efficient solutions in the industry for estimating intrinsic parameters of cameras on a vehicle during normal usage of the vehicle (e.g., online). Therefore, improved systems and techniques for online intrinsic calibration can be useful.

In one or more aspects, the systems and techniques provide for online intrinsic calibration. In one or more examples, the systems and techniques give a solution for estimating intrinsic parameters (e.g., focal length and principal point x, y) of a monocular camera mounted on a vehicle. The solution estimates the intrinsic parameters online (e.g., during normal usage of the vehicle), in contrast to calibration procedures performed point-by-point (e.g., using chessboard patterns) that need to be performed within a manufacturing facility, at a service center, etc. The solution uses an algorithm based on bundle adjustment.

Bundle adjustment is the simultaneous refining of 3D coordinates of a scene geometry, the parameters of relative motion, and the optical characteristics (e.g., intrinsic parameters) of one or more cameras utilized to capture images (e.g., image frames) of the scene (e.g., where the images depict 3D points from different viewpoints of the scene). For bundle adjustment, geometric bundles of rays of light originating from each 3D feature in the scene converge on each camera in all views, through the intrinsic parameters of the camera, which are adjusted optimally according to an optimality criterion involving corresponding image projections of all of the points in all views.

Bundle adjustment involves minimizing the reprojection error between the image locations of observed and predicted image points, which are expressed as the sum of the squares of nonlinear real-valued functions. This minimization can be achieved by using nonlinear least-squares algorithms (e.g., Levenberg-Marquardt algorithm, which uses a damping strategy that allows for a quick convergence). Bundle adjustment amounts to jointly refining a set of initial camera parameter (e.g., intrinsic parameter) estimates for finding a set of parameters (e.g., intrinsic parameters) that most accurately predict the locations of the observed points in the set of images.

In one or more examples, the systems and techniques perform repeated bundle adjustment using evenly distributed features over a video sequence (e.g., including a plurality of image frames) to determine intrinsic parameters and potential re-calibration for a camera. More specifically, the systems and techniques run a bundle adjustment utilizing initial intrinsic parameters, followed by a bundle adjustment using a common set of input points, and then using a varied inlier subset in subsequent bundle adjustment runs.

In one or more aspects, during operation of the systems and techniques for online intrinsic calibration, a processor, over a duration of time, may obtain a plurality of image frames of a 3D scene, wherein each image frame of the plurality of image frames may include a plurality of 2D points, and wherein each 2D point of the plurality of 2D points may correspond to a 3D point of a plurality of 3D points in the 3D scene. The processor may determine a subset of 3D points based on applying a bundle adjustment algorithm on a set of 3D points of the plurality of 3D points and on fixed parameters of a camera, wherein the set of 3D points may be distributed over a field of view (FOV) of the camera. The processor may determine a set of inlier points (e.g., 3D points including various 2D projections of the 3D points to the image plane, or 2D corresponding to the 2D projections of the 3D points to the image plane) from the subset of 3D points based on 3D points of the subset of 3D points with a reprojection error less than a threshold value. The processor may determine a final subset of 3D points and a final set of parameters of the camera based on applying the bundle adjustment algorithm on the set of inlier points and on a prior set of parameters of the camera. The processor may apply, to the camera, final intrinsic parameters of the final set of parameters of the camera.

In one or more examples, the set of 3D points may include an initial set of 3D points. In some examples, each 3D point of the initial set of 3D points may correspond to a plurality of 2D points within a track of a plurality a tracks. In one or more examples, each track of the plurality of tracks includes the plurality of 2D points over two or more image frames of the plurality of image frames. In some examples, the plurality of 2D points within a track of the plurality of tracks may have similar features.

In some examples, the camera may be a pinhole camera, a fisheye camera, or other type of camera. In one or more examples, the set of 3D points of the plurality of 3D points may correspond to 2D points within a subset of image frames of the plurality of image frames. In some examples, the image frames of the subset of image frames may be non-overlapping with each other.

In one or more examples, the fixed parameters of the camera may include view parameters and intrinsic parameters. In some examples, the fixed parameters of the camera may include fixed lens distortion parameters of the camera.

In some examples, the prior set of parameters may include an initial set of parameters of the camera. In one or more examples, the initial set of parameters of the camera may include an initial set of view parameters and an initial set of intrinsic parameters. In some examples, the initial set of intrinsic parameters may include nominal intrinsic values, previously estimated intrinsic values, randomized intrinsic values based on at least one of the nominal intrinsic values or the previously estimated intrinsic values, and/or intrinsic values from a table including the nominal intrinsic values as a function of temperature of the camera. In one or more examples, the camera may be associated with a vehicle, and wherein the initial set of view parameters may be based on a signal of the vehicle and/or visual odometry. In some examples, the signal of the vehicle may include a speed of the vehicle and/or a yaw rate of the vehicle.

In one or more examples, the final set of parameters of the camera may include final view parameters and the final intrinsic parameters. In some examples, the final intrinsic parameters may include a focal length and a principal point for the camera. In one or more examples, the final intrinsic parameters may compensate for a windshield distortion bias affecting the camera and/or a rolling shutter bias affecting the camera.

In one or more aspects, feature matching and initialization of 3D locations needs to be performed prior to bundle adjustment. Before bundle adjustment is performed, corresponding feature points (e.g., 2D points) need to be extracted from a sequence of images (e.g., image frames in a video stream) taken of a scene.

Figure 8:
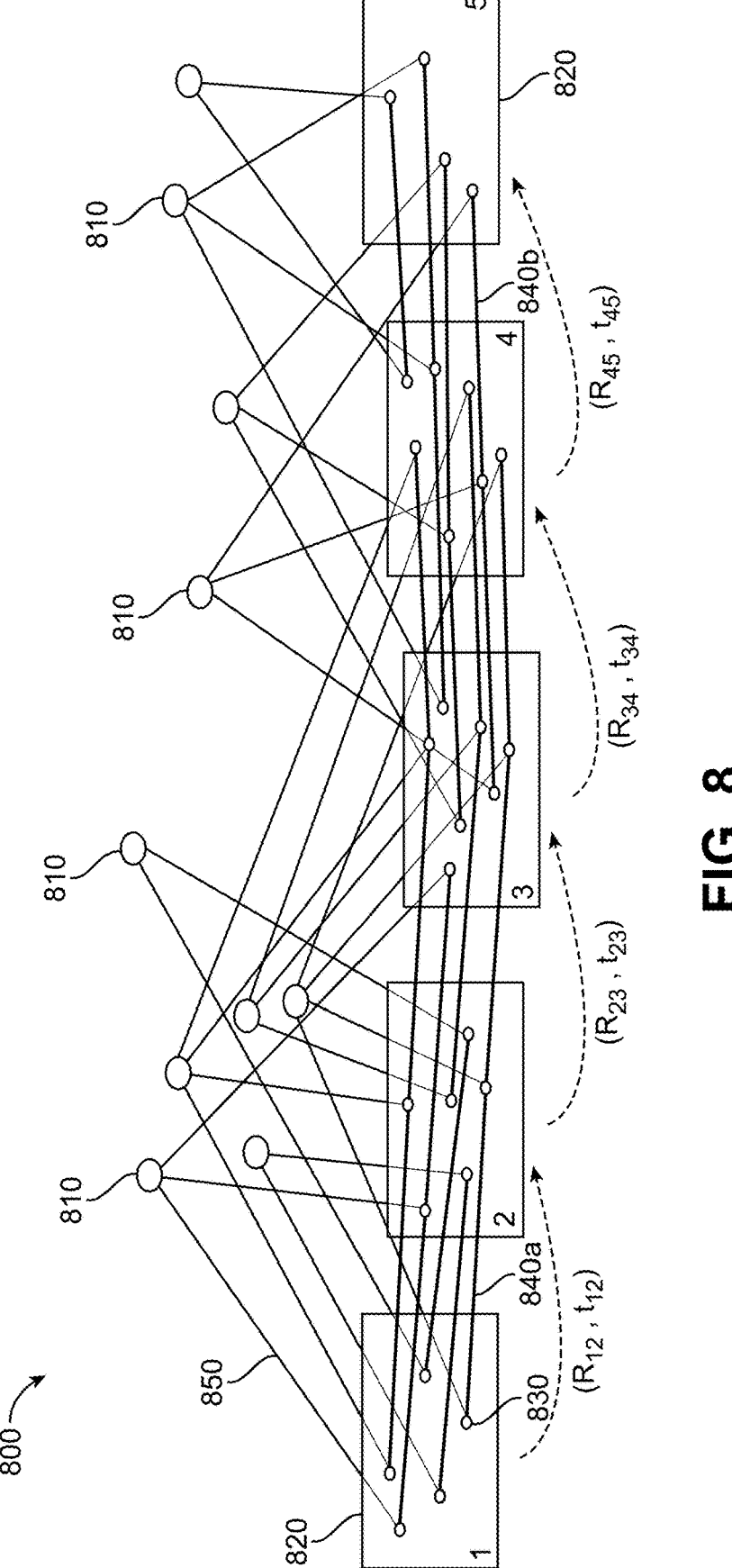
FIG. 8 is a diagram illustrating an example of feature matching and initialization of three-dimensional (3D) locations for bundle adjustment, in accordance with some examples.

FIG. 8 shows an example of feature matching and initialization of 3D locations. In particular, FIG. 8 is a diagram illustrating an example 800 of feature matching and initialization of 3D locations for bundle adjustment. In FIG. 8, a plurality of 3D points 810 of a 3D scene are shown. A camera, which may be mounted onto a vehicle, can obtain, over a duration of time, a plurality of image frames 820 (e.g., image frame 1, image frame 2, image frame 3, and image frame 4, and image frame 5, which may together form a video) of the scene. For example, image frame 1 may be obtained at time $t_1$, image frame 2 may be obtained at time $t_2$, image frame 3 may be obtained at time $t_3$, image frame 4 may be obtained at time $t_4$, and image frame 5 may be obtained at time $t_5$. The camera may have a different view (e.g., a pose, including a rotation and translation) for each of the image frames 820. Each image frame 820 includes a plurality of 2D points 830, where 2D point 820 corresponds to a 3D point 810 of the scene.

FIG. 8 shows a plurality of tracks (e.g., tracks 840a, 840b) that each are over (e.g., span across) two or more of the image frames 820. A track (e.g., track 840a or track 840b) is a set of 2D point 830 observations of a 3D point 810 (e.g., over multiple image frames 820). According to some aspects, a track (e.g., track 840a or track 840b) is created by matching features belonging to the 2D points 830 over the multiple image frames 820. As such, the 2D points 830 within a track (e.g., track 840a or track 840b) have similar features to each other. In one or more examples, the feature types may be binary robust independent elementary feature (BRIEF) or oriented FAST and rotated BRIEF (ORB). To achieve good results, the feature points (e.g., 2D points) should be approximately evenly distributed over the entire field of view. This even distribution can be achieved by various different ways, including using locally adaptive thresholds when detecting Harris or FAST feature points, sampling from a dense optical flow field, or applying some other type of zone mode.

Each 3D point 810 corresponds to a plurality of 2D points 820 in a track 840a, 840b. For example, track 840a is over (e.g., spans across) four image frames 820 (e.g., image frames 1, 2, 3, and 4) and includes a 2D point 830 from each of the four image frames 820. In another example, track 840b is over (e.g., spans across) three image frames 820 (e.g., image frames 3, 4, and 5) and includes a 2D point 830 from each of the three image frames 820. The locations of the 3D points 810 corresponding to the tracks (e.g., tracks 840a, 840b) can then initialized utilizing triangulation (e.g., as shown by reprojections 850).

Figure 9:
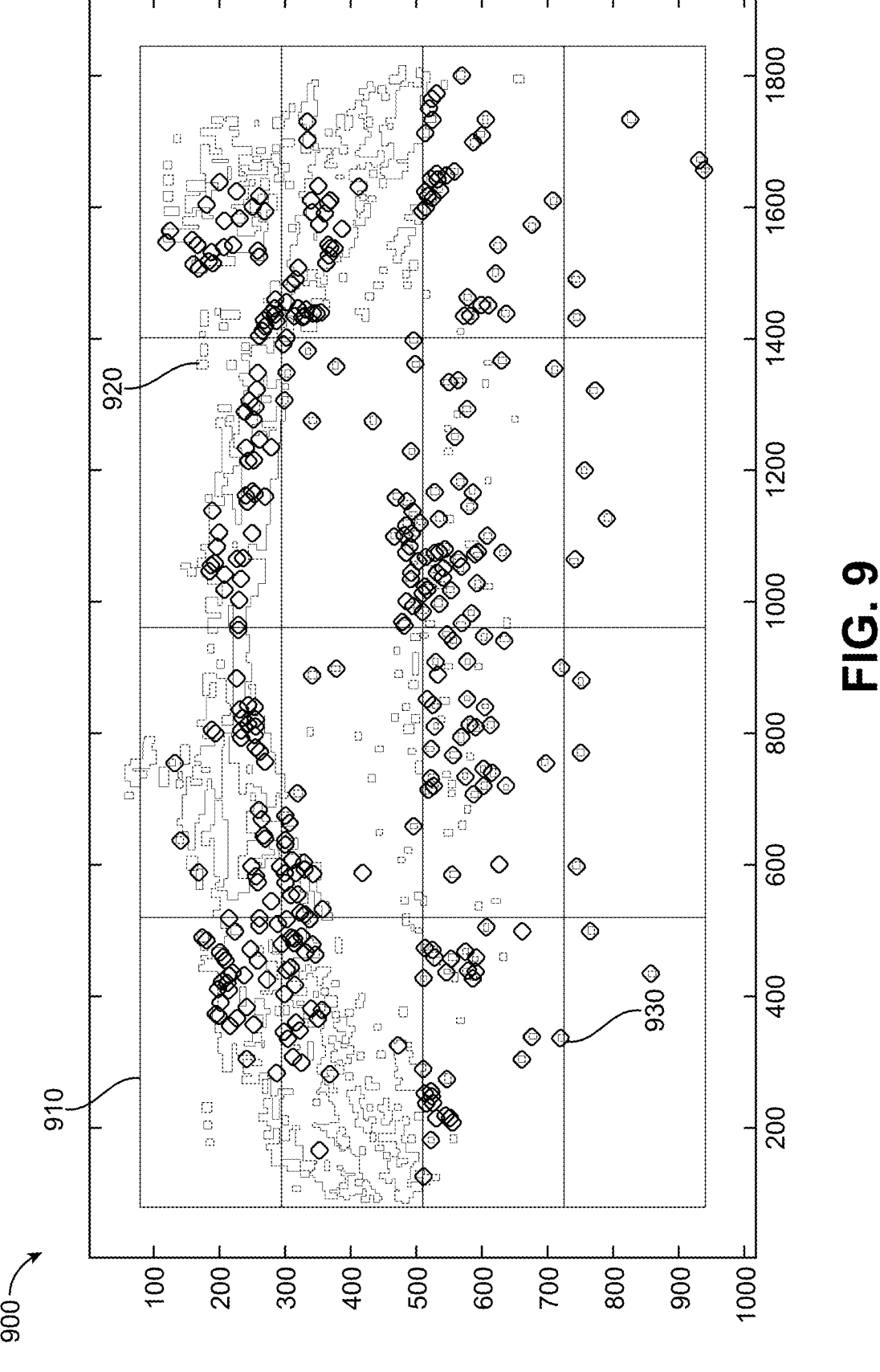
FIG. 9 is a graph illustrating examples of two-dimensional (2D) points from tracks that may be used for bundle adjustment, in accordance with some examples.

The tracks can then be selected evenly over the camera by dividing the image frame into a grid. FIG. 9 shows an example of an image frame (e.g., including 2D points from tracks) divided into a grid. In particular, FIG. 9 is a graph 900 illustrating examples of 2D points 920 from tracks that may be used (e.g., selected) for bundle adjustment. In FIG. 9, the graph 900 is divided into a grid including a total of sixteen (16) grid cells 910. Each of the grid cells 910 include a plurality of 2D points 920. 2D points 920 can be chosen from each grid cell 910 in order to obtain an even distribution of 2D points 920 over the image frame. The 2D points depicted with circles around them are the chosen 2D points 930.

Each 2D point 920 shown in FIG. 9 denotes a first location of a track. In one or more examples, 2D points 920 associated with the longest tracks in each grid cell 910 are chosen, if the number of 2D points 920 in the grid cell 910 is larger than a limit value (e.g., 32). For example, if the maximum number of 2D points 920 to be chosen for the image frame is 512 and there are a total of 16 grid cells 910, then the total number of points chosen for each grid cell 910 can be limited to 32 (e.g., 512/16=32). The tracks corresponding to the chosen 2D points 930 can then be used for bundle adjustment.

In one or more aspects, for bundle adjustment, different optimization variables and inlier tracks can be used. In one or more examples, the systems and techniques provide a process for online intrinsic calibration that involves running a bundle adjustment algorithm repeatedly using different settings and inputs. In one or more examples, the result from each step of the process can be used in the next step of the process. In some examples, the input set of tracks is the same during the repeated running of the bundle adjustment algorithm, but the subset of inlier tracks used in each step of the process can vary depending upon the reprojection errors of the tracks. During the process, if the average and maximum reprojection errors of a 3D location of a track are above a threshold value(s), then the track can be removed from the inlier set to be used in the next step of the process. However, the track may be included in a later step of the process, if the reprojection errors are again lower than a threshold value(s).

In one or more aspects, given initialized 3D points (e.g., as shown in FIG. 8 via triangulation) and initial values for the intrinsic parameters (e.g., focal length and principal point x, y) of the camera, to achieve a good convergence for bundle adjustment, the process of FIG. 10 can be utilized. FIG. 10 is a table 1000 illustrating an example of a process for bundle adjustment. In one or more examples, the process for bundle adjustment In FIG. 10, the table 1000 is shown to have a plurality of columns, including a step column 1010, a optimization variables column 1020, a robust column 1030, a maximum number of iterations column 1040, and a threshold for the average of the maximum reprojection error column 1050. The step column 1010 shows the different steps (e.g., steps 0, 1, 2, 3, and 4) to be performed for the process for bundle adjustment. For each step, the bundle adjustment algorithm can be run a number of iterations.

The optimization variables column 1020 includes the different variables that are to be optimized during the bundle adjustment runs for each of the different steps. The different variables that can be optimized include the 3D points, the camera views (e.g., rotation and translation), and the camera intrinsic parameters (e.g., focal length and principal point x, y). The robust column 1030 indicates whether or not the bundle adjustment runs for each step will be run robustly (e.g., run using a set of inlier points, which can be 3D points or 2D points corresponding to projections of the 3D points to the image plane). The maximum number of iterations column 1040 indicates the maximum number of iterations that the bundle adjustment algorithm can be run for each of the steps. The threshold for the average of the maximum reprojection error column 1050 gives the threshold value for the average of the maximum reprojection error for each of the steps.

In one or more examples, the process for bundle adjustment as shown in the table 1000 of FIG. 10 is an example process. In some examples, the process for bundle adjustment may differ than as shown in the table 1000 of FIG. 10. For example, the process may have more or less steps, different optimization variables, different numbers of maximum iterations, and/or different values for the threshold for the average of the maximum reprojection error than as is shown in the table 1000 of FIG. 10.

In one or more aspects, for the process for online intrinsic calibration, a processor (e.g., within a vehicle) can obtain (e.g., from a camera on the vehicle), over a duration of time, a plurality of image frames of a 3D scene. Each of the image frames can include a plurality of 2D points. Each of the 2D points can correspond to a 3D point of a plurality of 3D points within the scene.

During operation of the process as shown in the table 1000 for online intrinsic calibration, at step 0, the processor (e.g., within the vehicle) can determine a first subset of 3D points based on applying (e.g., running) a bundle adjustment algorithm on an initial set of 3D points (e.g., initialized 3D points that are approximately evenly distributed over a field of view of the camera) and on fixed parameters of the camera (e.g., including view parameters, intrinsic parameters and, optionally, fixed lens distortion parameters associated with the camera). During step 0, the variable parameters are the 3D points, and the maximum number of iterations that the bundle adjustment algorithm can be run is five (5). The processor, during step 0, can also determine a first set of inlier points from the determined first subset of 3D points based on (e.g., by using) 3D points of the first subset of 3D points that have a reprojection error (e.g., an average reprojection error) that is less than the threshold for the average of the maximum reprojection error of fifteen (15) points (px) (or other threshold value). The set of inlier points can be a set of 3D points or a set of 2D points corresponding to projections of the 3D points to the image plane (due to the observations being performed in the image).

During the process, at step 1, the processor can determine a second subset of 3D points based on applying (e.g., running) the bundle adjustment algorithm on the determined first set of inlier points and on the fixed parameters of the camera. During step 1, the variable parameters are the 3D points, and the maximum number of iterations that the bundle adjustment algorithm can be run is five. While the maximum number of iterations is shown as five in the illustrative example of FIG. 10, other numbers of iterations can be performed. The processor, during step 1, can also determine a second set of inlier points (e.g., 3D points or 2D points) from the determined second subset of 3D points based on (e.g., by using) 3D points of the second subset of 3D points that have a reprojection error (e.g., an average reprojection error) that is less than the threshold for the average of the maximum reprojection error of fifteen points.

During the process, at step 2, the processor can determine a third subset of 3D points and a first set of parameters of the camera (e.g., including first view parameters and first intrinsic parameters associated with the camera) based on applying (e.g., running) the bundle adjustment algorithm on the determined second set of inlier points and on an initial set of parameters of the camera (e.g., including an initial set of view parameters and an initial set of intrinsic parameters associated with the camera). During step 2, the variable parameters are the 3D points, the view parameters, and the intrinsic parameters. The maximum number of iterations that the bundle adjustment algorithm can be run is thirty (although other numbers of iterations can be performed in other examples). The processor, during step 2, can also determine a third set of inlier points (e.g., 3D points or 2D points) from the determined third subset of 3D points based on (e.g., by using) 3D points of the third subset of 3D points that have a reprojection error (e.g., an average reprojection error) that is less than the threshold for the average of the maximum reprojection error of five points.

During the process, at step 3, the processor can determine a fourth subset of 3D points and a second set of parameters of the camera (e.g., including second view parameters and second intrinsic parameters associated with the camera) based on applying (e.g., running) the bundle adjustment algorithm on the determined third set of inlier points and on the determined first set of parameters of the camera. During step 3, the variable parameters are the 3D points, the view parameters, and the intrinsic parameters. The maximum number of iterations that the bundle adjustment algorithm can be run is one-hundred (100) in the example of FIG. 10. Other numbers of iterations can be performed in other examples. The processor, during step 3, can also determine a fourth set of inlier points (e.g., 3D points or 2D points) from the determined fourth subset of 3D points based on (e.g., by using) 3D points of the fourth subset of 3D points that have a reprojection error (e.g., an average reprojection error) that is less than the threshold for the average of the maximum reprojection error of 1.5 points.

During the process, at step 4, the processor can determine a fifth subset of 3D points and a third set of parameters of the camera (e.g., including third view parameters and optimized intrinsic parameters associated with the camera) based on applying (e.g., running) the bundle adjustment algorithm on the determined fourth set of inlier points and on the determined second set of parameters of the camera. During step 4, the variable parameters are the 3D points, the view parameters, and the intrinsic parameters. The maximum number of iterations that the bundle adjustment algorithm can be run is fifty (50) (although other numbers of iterations can be performed in other examples). The processor can then apply to (e.g., update the calibration of) the camera the optimized intrinsic parameters (e.g., an optimized focal length and principal point x, y) of the determined third set of parameters of the camera.

Figure 11:
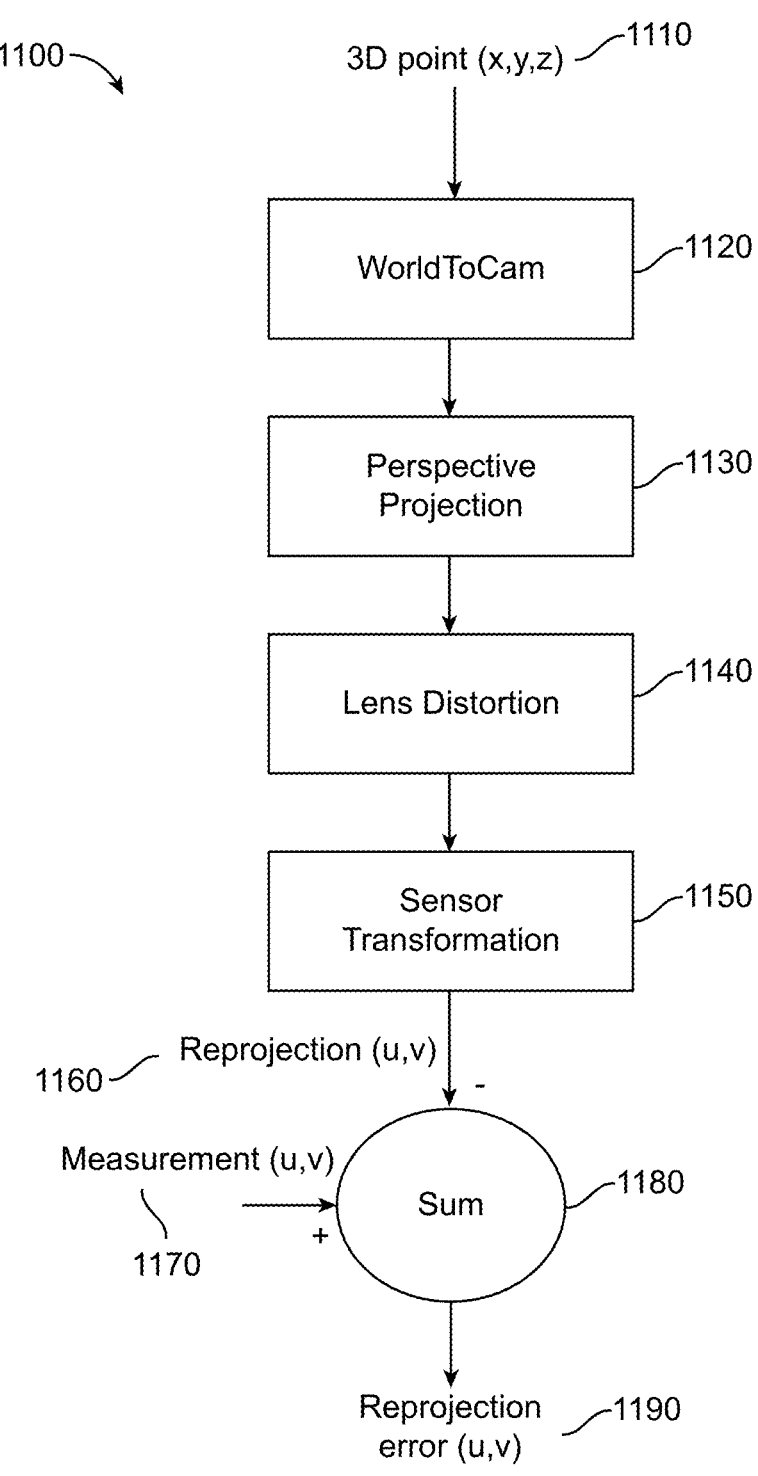
FIG. 11 is a flow chart illustrating an example of a process for determining a reprojection error for online intrinsic calibration, in accordance with some examples.

FIG. 11 shows an example of a process for determining a reprojection error for online intrinsic calibration using bundle adjustment. In particular, FIG. 11 is a flow chart illustrating an example of a process 1100 for determining a reprojection error for online intrinsic calibration. In FIG. 11, during operation of the process 1100, a 3D point (X, Y, Z) 1110 can be transformed to camera settings (e.g., WorldTo-Cam 1120). A perspective projection 1130 can then be obtained. A lens distortion 1140 transformation (e.g., compensation for the lens distortion) can be applied. A sensor transformation 1150 (e.g., transformation of the intrinsic parameters, including the focal length and principal point x, y) can be applied. The resultant reprojection (u,v) 1160 can then be compared (e.g., by performing a difference with a summer 1180) with the corresponding measurement (u,v) 1170 to determine a reprojection error (u,v) 1190. In one or more examples, the variables of the camera transformation, the lens distortion, and/or the intrinsic parameters may be fixed and/or controlled by settings.

In one or more examples, a nonlinear equation can be solved over a determined system of questions $f(x)=0$, where $f(x)$ is the reprojection error 1190. The Jacobian of $f(x)$ can be computed with a forward and backward pass per module. Two equations can be used for each feature point per camera in which it is observed (e.g., 2×nPoints×nViews). The system of equations has a structure, which can be utilized for speed (e.g., using the Schur algorithm and/or a symmetric algorithm). In one or more examples, robust objective functions (e.g., the Huber algorithm and/or the Cauchy algorithm) may be utilized.

In one or more examples, all of the parameters to be estimated may be collected in a vector x with a length M. The reprojection error is then a function of the parameters x and can be denoted as $f(x)$, which is a vector of length equal to 2N, where N is the total number of 2D observations in all frames. The Jacobian of $f(x)$ can be denoted with respect to x as $J(x)$. The Jacobian $J(x)$ may be a matrix with 2N rows and M columns. The Bundle adjustment problem $$\operatorname*{argmin}_{x}\|f(x)\|^2$$

can be minimized by applying, for instance, the Levenberg-Marquardt algorithm. Then, in every iteration, the next iterate can be obtained as $x_{k+1}=x_k-\Delta x_k$, where $\Delta x_k$ can be obtained by solving the linear system of equations $[J^T(x_k)J(x_k)+\gamma I]\Delta x_k=J^T(x_k)f(x_k)$, where $\gamma$ is a damping parameter. The iterations can continue until certain criteria are met, for instance until $\Delta x_k$ is small enough or until the maximum number of iterations has been reached.

In one or more aspects, the intrinsic parameters can be estimated online (e.g., during normal operation of a vehicle)

for each camera individually one at a time. As such, it is not necessary to estimate the intrinsic parameters for all of the cameras at the same time.

Figure 12:
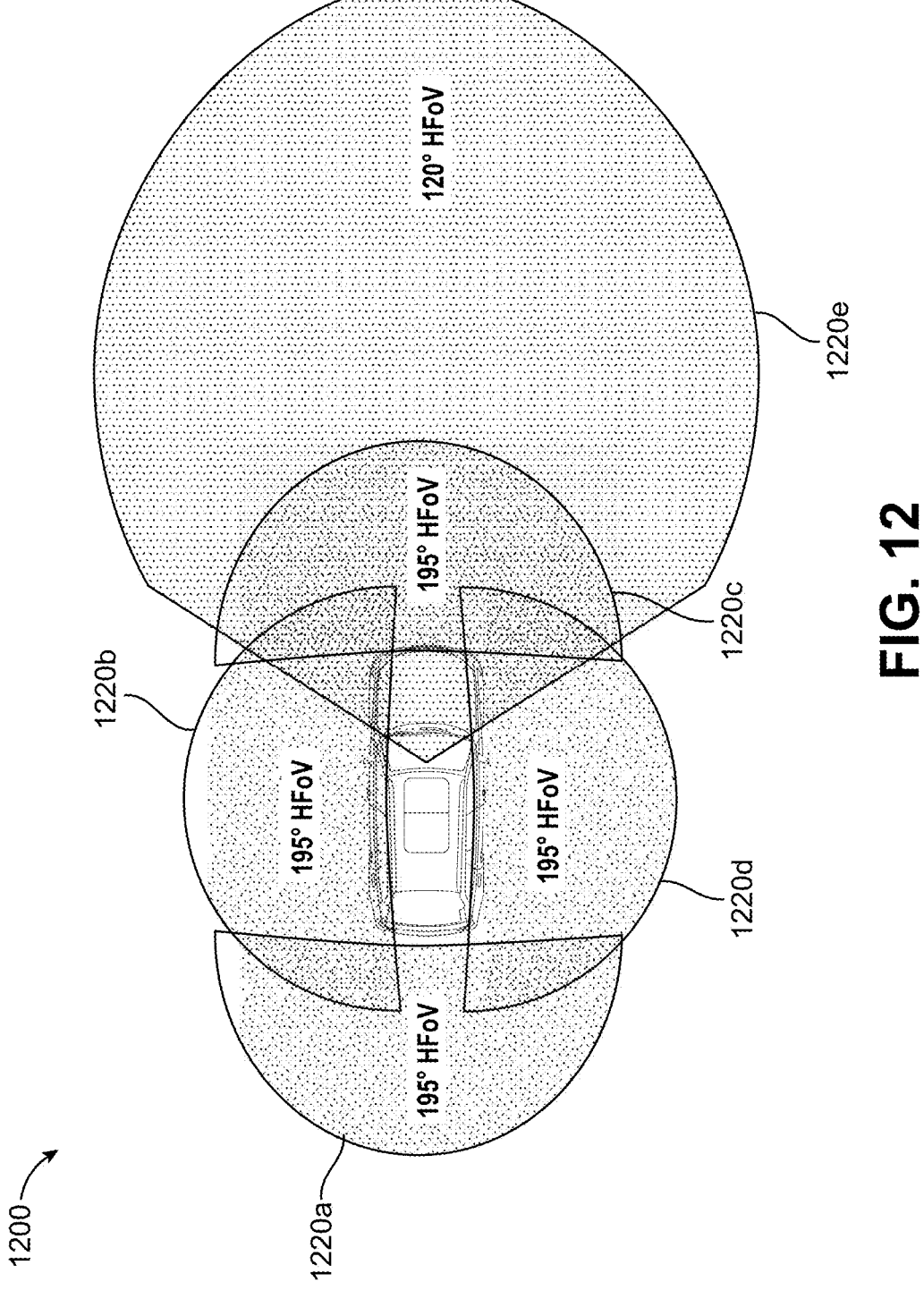
FIG. 12 is a diagram illustrating an example of a vehicle with multiple cameras with different field of views, in accordance with some examples.

FIG. 12 shows an example of a vehicle with a plurality of cameras. In particular, FIG. 12 is a diagram illustrating an example 1200 of a vehicle 1210 with multiple cameras with different field of views. In FIG. 12, the vehicle 1210 has a total of five cameras, with each camera having a respective field of view 1220a, 1220b, 1220c, 1220d, 1220e. The solution of the systems and techniques utilizing bundle adjustment for online intrinsic calibration is flexible and can handle many product variants (e.g., can be scaled from one camera to many cameras).

In one or more aspects, the solution of the systems and techniques utilizing bundle adjustment for online intrinsic calibration is generic and can be applied for various different types of cameras (e.g., pinhole cameras and/or fisheye cameras).

FIG. 13 shows examples images obtained by different types of cameras. In particular, FIG. 13 is a diagram illustrating examples 1300 of images 1310, 1320 obtained by different types of cameras that may be utilized for online intrinsic calibration. In FIG. 13, an image 1310 captured by a camera with a 120 degree FOV, and an image 1320 captured by a camera with a 195 degree FOV, are shown. In one or more examples, the solution can be applied for other types of cameras than these cameras (e.g., pinhole camera and fisheye camera) of FIG. 13.

In one or more aspects, instead of recursive estimating (e.g., using a Kalman filter), estimates from smaller chunks (e.g., chunks of image frames) can be aggregated together to create histograms. In one or more examples, the total amount of captured image frames (e.g., 450 image frames) can be split into smaller non-overlapping chunks of image frames (e.g., each chunk with 20 image frames). In one or more examples, the first image frames (e.g., of the captured image frames) can be skipped in order to avoid transients in the feature extraction thresholds.

Figure 14:
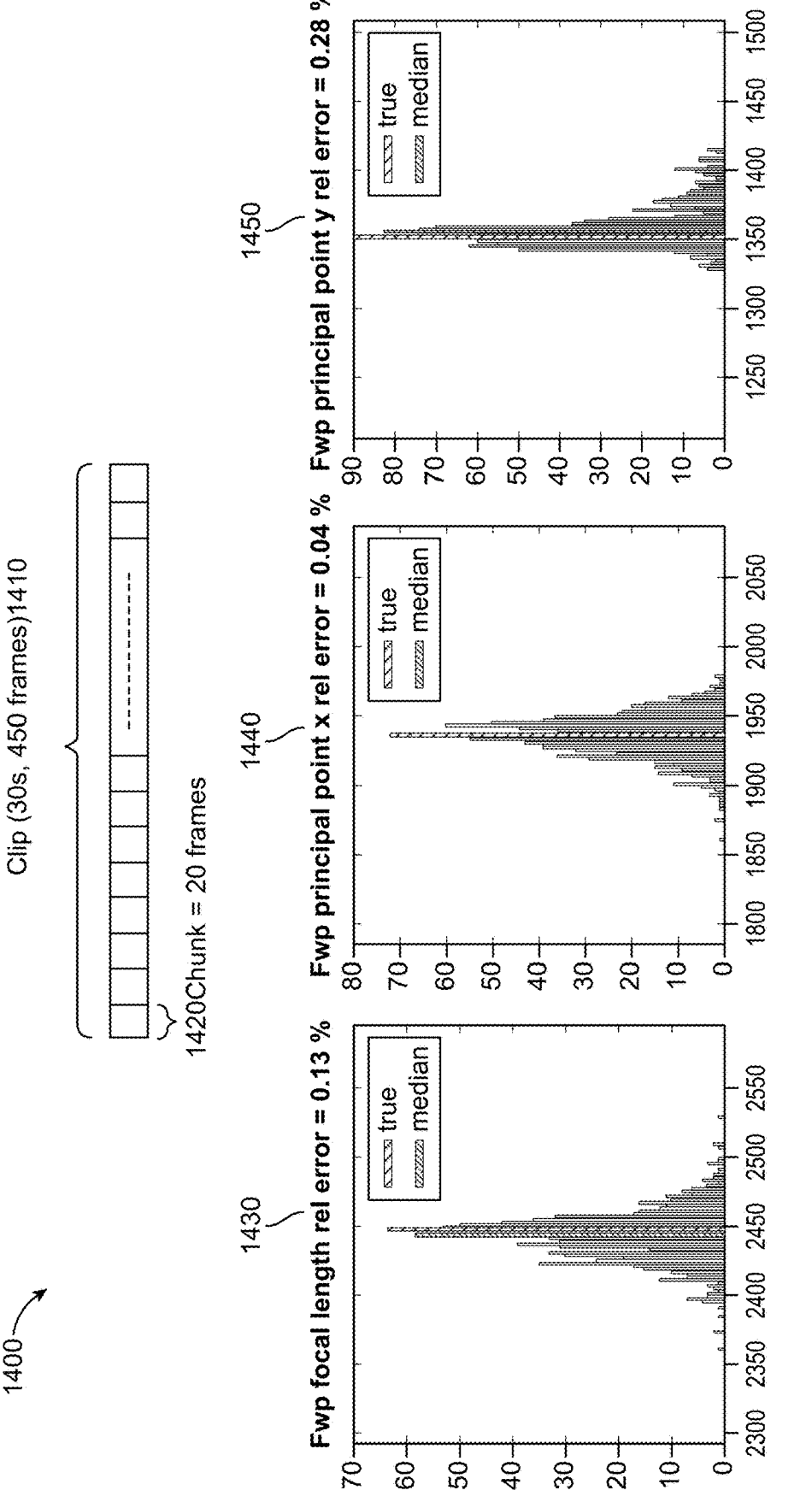
FIG. 14 is a diagram illustrating an example of utilizing chunks of image frames for bundle adjustment, in accordance with some examples.

FIG. 14 shows an example of using chunks of image frames for online intrinsic calibration using bundle adjustment. In particular, FIG. 14 is a diagram illustrating an example 1400 of utilizing chunks of image frames for bundle adjustment. In FIG. 14, a clip 1410 of video (e.g., of length 30 seconds) is shown to include 450 image frames. The clip 1410 can be divided up into chunks 1420 each having 20 image frames.

In one or more examples, the solution for online intrinsic calibration using bundle adjustment (e.g., as shown in table 1000 of FIG. 10) can be applied to each chunk 1420 of image frames. As such, the intrinsic parameters can be estimated for each chunk 1420.

FIG. 14 shows graphs 1430, 1440, 1450 that contain histograms of the determined estimated intrinsic parameters (e.g., focal length and principal point x, y) for each chunk 1420. For example, graph 1430 shows a histogram of the estimated focal length for a plurality of chunks of data, graph 1440 shows a histogram of the estimated x value for the principal point for the plurality of chunks of data, and graph 1450 shows a histogram of the estimated y value for the principal point for the plurality of chunks of data. In one or more examples, the median can be computed and/or the peak can be determined for each of the histograms in the graphs 1430, 1440, 1450. In some examples, the uncertainty of the estimate of the intrinsic parameters can be computed from the variance of the distribution of the histograms.

In one or more aspects, the calculations performed for online intrinsic calibration using bundle adjustment can be distributed such that the runtime is not negatively affected. The calculations do not need to be processed one frame at a time. The calculations can be distributed over time (as long as the temperature of the camera is fairly stable during this time). For example, the calculations for chunks can be performed during idle times when capacity is available on a system on a chip (SOC) because the data can be aggregated over a long period of time.

In one or more aspects, various different hypotheses can be used as initial values for the intrinsic parameters to be estimated. In one or more examples, the initial set of intrinsic parameters (e.g., used for the process shown in the table 1000 of FIG. 10) can include nominal intrinsic values (e.g., from the manufacturer of the camera). In some examples, the initial set of intrinsic parameters can include previously estimated intrinsic values (e.g., resulting values from previous runs of the bundle adjustment algorithm or process). In one or more examples, the initial set of intrinsic parameters can include randomized intrinsic values based on the nominal intrinsic values and/or the previously estimated intrinsic values. For example, the initial set of intrinsic parameters can be a sample from a distribution with a mean of either the nominal intrinsic values or the previously estimated intrinsic values.

In one or more aspects, other parameters for the online intrinsic calibration using bundle adjustment may be initialized in various different ways. In one or more examples, the 3D points may be initialized from triangulation (e.g., as shown in FIG. 8). In some examples, camera transforms (e.g., for an initial set of parameters, for example for the WorldToCam 1120 of FIG. 11) can be obtained from a signal of a vehicle (e.g., including speed of the vehicle and/or yaw rate of the vehicle) and/or from visual odometry (e.g., obtained by running an algorithm prior to performing the online intrinsic calibration). In one or more examples, the perspective projection (e.g., perspective projection 1130 of FIG. 11) contains no parameters. In some examples, the lens distortion parameters (e.g., lens distortion 1140 of FIG. 11) are known and fixed.

In some aspects, using a camera with a lens with a known lens distortion can help to improve observability and critical motion. In one or more examples, utilizing a camera with a known lens distortion can make the intrinsic parameters (e.g., focal length and principal point x, y) more observable. For example, for a two-frame pure translation, the intrinsic parameters may not be observable for a pinhole camera without a known lens distortion. However, by adding a known non-linearity, like a known lens distortion, observability of the intrinsic parameters can be improved.

In one or more aspects, the intrinsic parameters can compensate for windshield distortion. In one or more examples, the camera may be mounted inside of the vehicle such that the windshield distorts the captured image frame in a specific way, which can cause the intrinsic parameters to have a certain offset. For example, the windshield can cause light rays to change direction of their path to the camera, which can cause a bias that needs to be compensated. By compensating for the windshield distortion in the intrinsic parameters, the bias can be reduced significantly.

Figure 15:
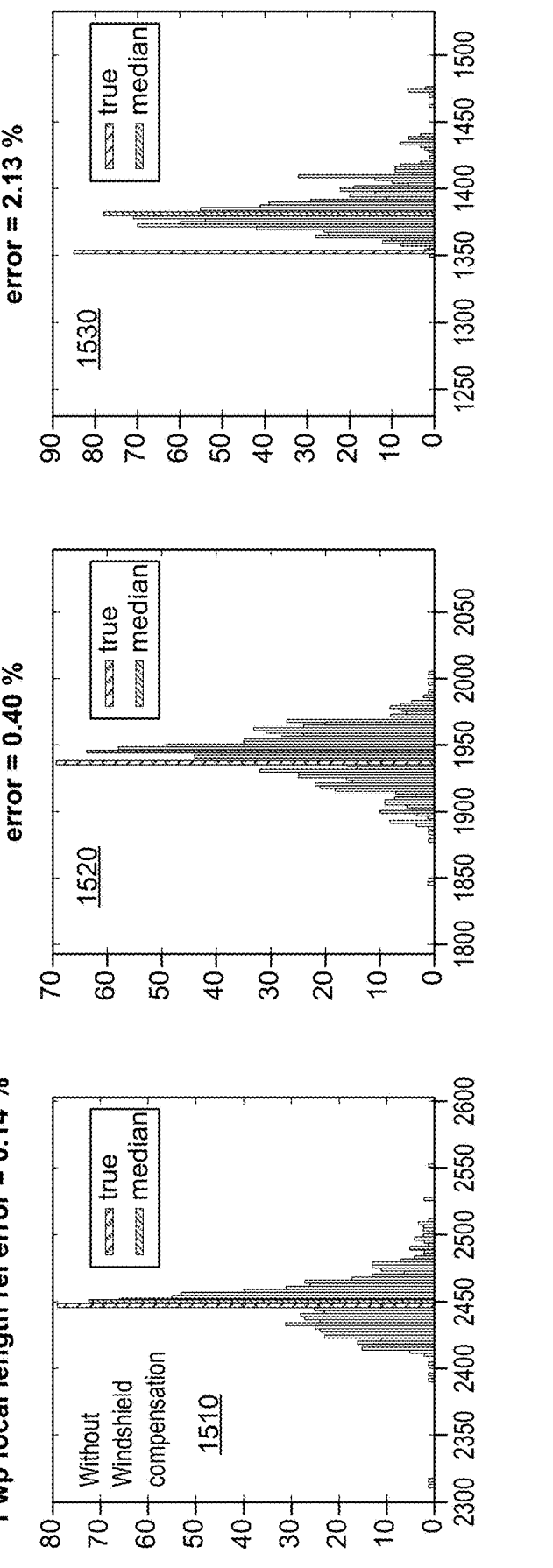
FIG. 15 are graphs illustrating examples of intrinsic parameters of a camera compensated for a windshield distortion bias, in accordance with some examples.
Figure 15:
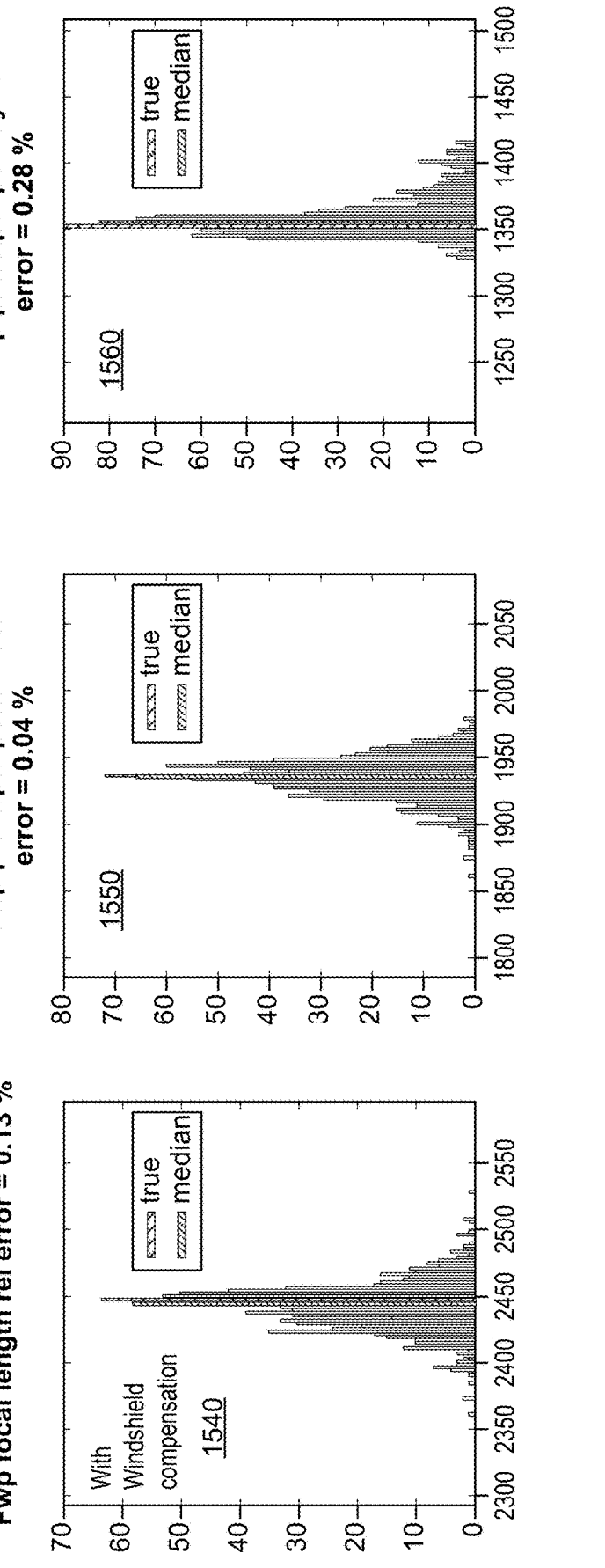

FIG. 15 shows examples of intrinsic parameters compensated for windshield distortion. In particular, FIG. 15 are graphs illustrating examples 1500 of intrinsic parameters of a camera compensated for a windshield distortion bias. FIG. 15 shows graphs 1510, 1520, 1530 that contain histograms of the determined estimated intrinsic parameters (e.g., focal length and principal point x, y) for each chunk of image frames, without windshield compensation. For example, graph 1510 shows a histogram of the estimated focal length for a plurality of chunks of data, graph 1520 shows a histogram of the estimated x value for the principal point for the plurality of chunks of data, and graph 1530 shows a histogram of the estimated y value for the principal point for the plurality of chunks of data.

FIG. 15 also shows graphs 1540, 1550, 1560 that contain histograms of the determined estimated intrinsic parameters (e.g., focal length and principal point x, y) for each chunk of image frames, with windshield compensation. For example, graph 1540 shows a histogram of the estimated focal length for a plurality of chunks of data, graph 1550 shows a histogram of the estimated x value for the principal point for the plurality of chunks of data, and graph 1560 shows a histogram of the estimated y value for the principal point for the plurality of chunks of data. In FIG. 15, the graphs 1540, 1550, 1560 with windshield compensation are shown to have lower intrinsic parameter errors than the graphs 1510, 1520, 1530 without windshield compensation.

In one or more aspects, the intrinsic parameters can compensate for rolling shutter. Rolling shutter causes different rows in an image frame to be read out at different points in time, which can lead to a distorted image frame. This distortion can cause a bias in the estimated intrinsic values. By compensating for the rolling shutter in the intrinsic parameters, the bias can be reduced significantly.

Figure 16:
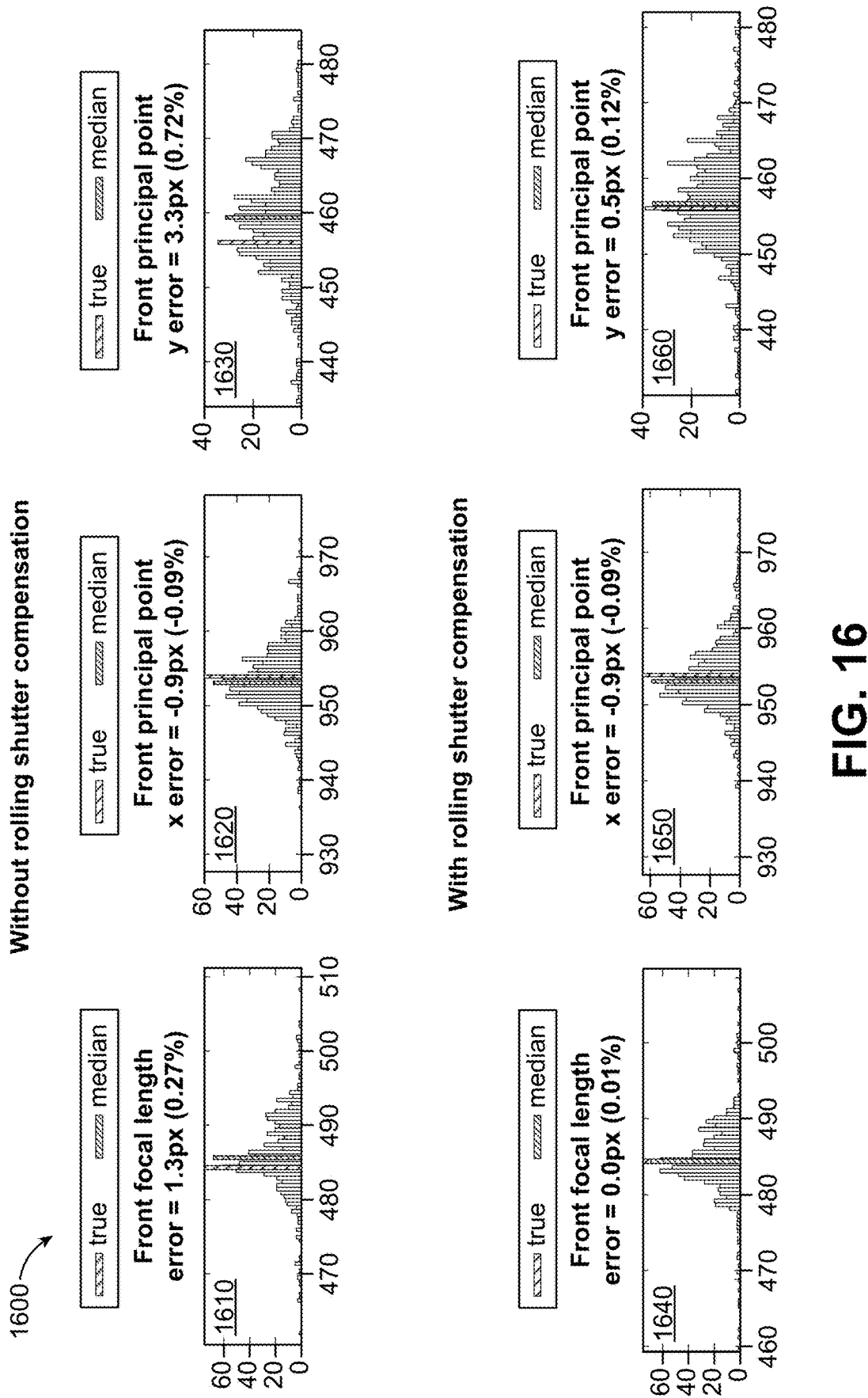
FIG. 16 are graphs illustrating examples of intrinsic parameters of a camera compensated for a rolling shutter bias, in accordance with some examples.

FIG. 16 shows examples of intrinsic parameters compensated for rolling shutter. In particular, FIG. 16 are graphs illustrating examples 1600 of intrinsic parameters of a camera compensated for a rolling shutter bias. FIG. 16 shows graphs 1610, 1620, 1630 that contain histograms of the determined estimated intrinsic parameters (e.g., focal length and principal point x, y) for each chunk of image frames, without rolling shutter compensation. For example, graph 1610 shows a histogram of the estimated focal length for a plurality of chunks of data, graph 1620 shows a histogram of the estimated x value for the principal point for the plurality of chunks of data, and graph 1630 shows a histogram of the estimated y value for the principal point for the plurality of chunks of data.

FIG. 16 shows graphs 1640, 1650, 1660 that contain histograms of the determined estimated intrinsic parameters (e.g., focal length and principal point x, y) for each chunk of image frames, with rolling shutter compensation. For example, graph 1640 shows a histogram of the estimated focal length for a plurality of chunks of data, graph 1650 shows a histogram of the estimated x value for the principal point for the plurality of chunks of data, and graph 1660 shows a histogram of the estimated y value for the principal point for the plurality of chunks of data. In FIG. 16, the graphs 1640, 1650, 1660 with rolling shutter compensation are shown to have lower intrinsic parameter errors than the graphs 1610, 1620, 1630 without rolling shutter compensation.

FIG. 17 is a flow chart illustrating an example of a process 1700 for online intrinsic calibration. The process 1700 can be performed by a computing device (e.g., image capture and processing system 200 of FIG. 2, the image processor 350 of FIG. 3, a computing device or computing system 1800 of FIG. 18, and/or other device or system) or by a component or system (e.g., a chipset, one or more processors, one or more central processing units (CPUs), digital signal processors (DSPs), graphics processing units (GPUs), any combination thereof, and/or other type of processor(s), or other component or system) of the computing device. The operations of the process 1700 may be implemented as software components that are executed and run on one or more processors (e.g., processor 1810 of FIG. 18 or other processor(s)). Further, the transmission and reception of signals by the computing device in the process 1700 may be enabled, for example, by one or more antennas and/or one or more transceivers (e.g., wireless transceiver(s)).

At block 1710, the computing device (or component thereof) can obtain, over a duration of time, a plurality of image frames of a three-dimensional (3D) scene. Each image frame of the plurality of image frames includes a plurality of two-dimensional (2D) points. Each 2D point of the plurality of 2D points corresponds to a 3D point of a plurality of 3D points in the 3D scene. As described herein, in some cases, the set of 3D points includes an initial set of 3D points. For instance, each 3D point of the initial set of 3D points corresponds to a plurality of 2D points within a track of a plurality of tracks (e.g., such as track 840*a* described with respect to FIG. 8). In some cases, each track of the plurality of tracks includes the plurality of 2D points over two or more image frames of the plurality of image frames (e.g., as illustrated in FIG. 8). In some aspects, the plurality of 2D points within a track of the plurality of tracks have similar features. Referring to FIG. 8 as one illustrative a track (e.g., track 840*a* or track 840*b*) can be generated by matching features belonging to the 2D points 830 over the multiple image frames 820.

At block 1720, the computing device (or component thereof) can determine a subset of 3D points based on applying a bundle adjustment algorithm (e.g., as described with respect to FIG. 10) on a set of 3D points of the plurality of 3D points and on fixed parameters of a camera (e.g., a pinhole camera, a fisheye camera, or other type of camera). The set of 3D points are distributed over a field of view of the camera. In some aspects, the set of 3D points of the plurality of 3D points correspond to 2D points within a subset of image frames of the plurality of image frames. In some aspects, the fixed parameters of the camera include view parameters and intrinsic parameters. Additionally or alternatively, in some cases, the fixed parameters of the camera include fixed lens distortion parameters of the camera.

At block 1730, the computing device (or component thereof) can determine a set of inlier points from the subset of 3D points based on 3D points of the subset of 3D points with a reprojection error less than a threshold value.

At block 1740, the computing device (or component thereof) can determine a final subset of 3D points and a final set of parameters of the camera based on applying the bundle adjustment algorithm on the set of inlier points and on a prior set of parameters of the camera. In some aspects, the prior set of parameters includes an initial set of parameters of the camera. In some cases, the initial set of parameters of the camera include an initial set of view parameters and an initial set of intrinsic parameters. In some cases, the initial set of intrinsic parameters include nominal intrinsic values, previously estimated intrinsic values, randomized intrinsic values based on at least one of the nominal intrinsic values or the previously estimated intrinsic values, intrinsic values from a table including the nominal intrinsic values as a function of temperature of the camera, any combination thereof, and/or other parameter(s). In one illustrative example, the camera is associated with a vehicle. In such an example, the initial set of view parameters are based on at least one of a signal of the vehicle or visual odometry. In some cases, the signal of the vehicle includes at least one of a speed of the vehicle or a yaw rate of the vehicle.

At block 1750, the computing device (or component thereof) can apply, to the camera, final intrinsic parameters of the final set of parameters of the camera. In some aspects, the final set of parameters of the camera include final view parameters and the final intrinsic parameters. In some cases, the final intrinsic parameters include a focal length and a principal point for the camera. In some examples, the final intrinsic parameters compensate for at least one of a windshield distortion bias affecting the camera or a rolling shutter bias affecting the camera.

In some cases, the computing device of process 1700 may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the Wi-Fi (802.11x) standards, data according to the Bluetooth™ standard, data according to the Internet Protocol (IP) standard, and/or other types of data.

The components of the computing device of process 1700 can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1700 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, process 1700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 18:
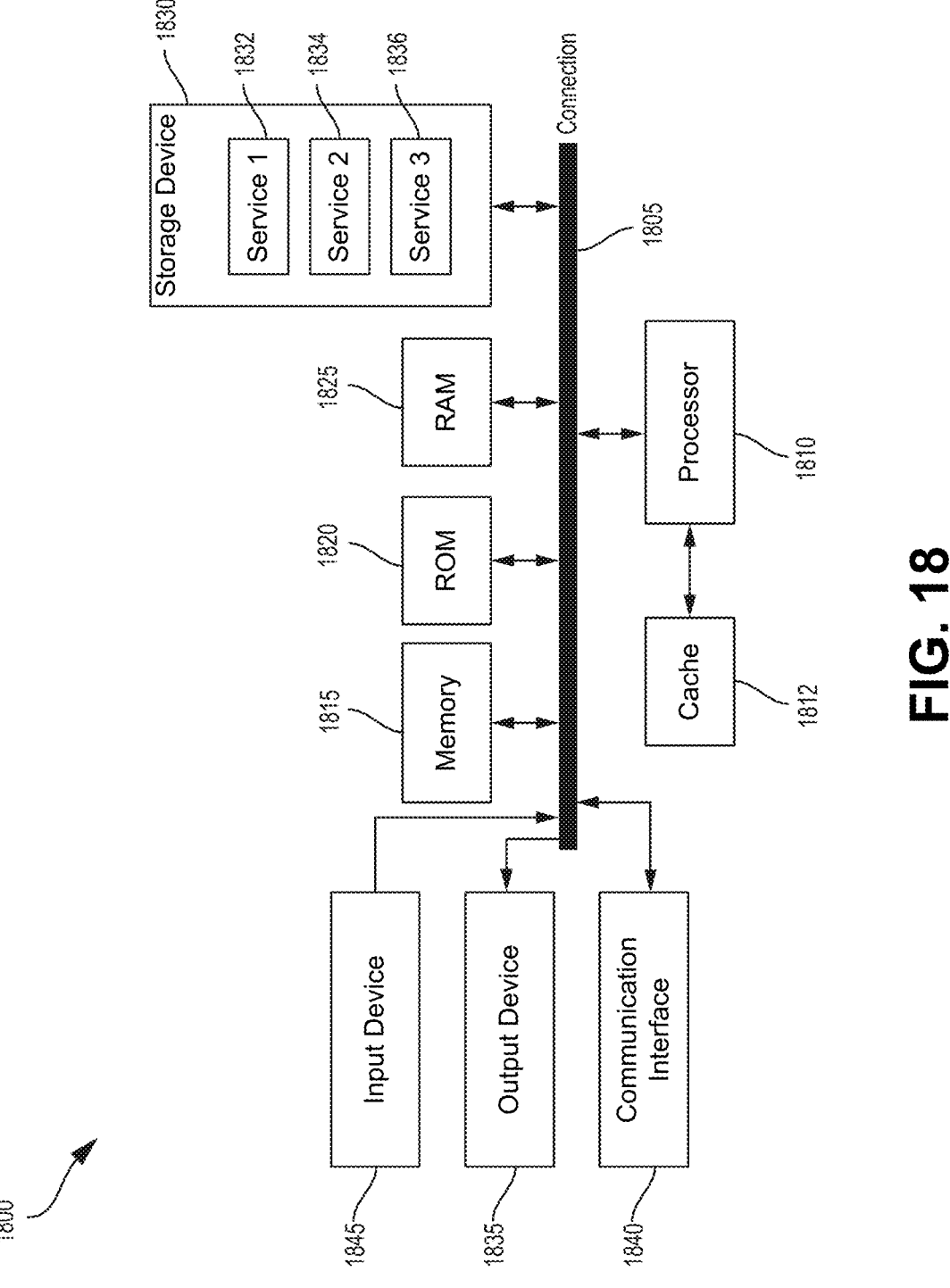
FIG. 18 is a diagram illustrating an example of a system for implementing certain aspects described herein.

FIG. 18 is a block diagram illustrating an example of a computing system 1800, which may be employed for online intrinsic calibration. In particular, FIG. 18 illustrates an example of computing system 1800, which can be for example any computing device making up internal computing system, a remote computing system, a camera, or any component thereof in which the components of the system are in communication with each other using connection 1805. Connection 1805 can be a physical connection using a bus, or a direct connection into processor 1810, such as in a chipset architecture. Connection 1805 can also be a virtual connection, networked connection, or logical connection.

In some aspects, computing system 1800 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1800 includes at least one processing unit (CPU or processor) 1810 and connection 1805 that communicatively couples various system components including system memory 1815, such as read-only memory (ROM) 1820 and random access memory (RAM) 1825 to processor 1810. Computing system 1800 can include a cache 1812 of high-speed memory connected directly with, in close proximity to, or integrated as part of processor 1810.

Processor 1810 can include any general purpose processor and a hardware service or software service, such as services 1832, 1834, and 1836 stored in storage device 1830, configured to control processor 1810 as well as a special-purpose processor where software instructions are incorporated into the actual processor design. Processor 1810 may essentially be a completely self-contained computing system, containing multiple cores or processors, a bus, memory controller, cache, etc. A multi-core processor may be symmetric or asymmetric.

To enable user interaction, computing system 1800 includes an input device 1845, which can represent any number of input mechanisms, such as a microphone for speech, a touch-sensitive screen for gesture or graphical input, keyboard, mouse, motion input, speech, etc. Computing system 1800 can also include output device 1835, which can be one or more of a number of output mechanisms. In some instances, multimodal systems can enable a user to provide multiple types of input/output to communicate with computing system 1800.

Computing system 1800 can include communications interface 1840, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1840 may also include one or more range sensors (e.g., LiDAR sensors, laser range finders, RF radars, ultrasonic sensors, and infrared (IR) sensors) configured to collect data and provide measurements to processor 1810, whereby processor 1810 can be configured to perform determinations and calculations needed to obtain various measurements for the one or more range sensors. In some examples, the measurements can include time of flight, wavelengths, azimuth angle, elevation angle, range, linear velocity and/or angular velocity, or any combination thereof. The communications interface 1840 may also include one or more Global Navigation Satellite System (GNSS) receivers or transceivers that are used to determine a location of the computing system 1800 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1830 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L#) cache), resistive random-access memory (RRAM/ReRAM), phase change memory (PCM), spin transfer torque RAM (STT-RAM), another memory chip or cartridge, and/or a combination thereof.

The storage device 1830 can include software services, servers, services, etc., that when the code that defines such software is executed by the processor 1810, it causes the system to perform a function. In some aspects, a hardware service that performs a particular function can include the software component stored in a computer-readable medium in connection with the necessary hardware components, such as processor 1810, connection 1805, output device 1835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, engines, circuits, and algorithm steps described in connection with the embodiments disclosed herein may be implemented as electronic hardware, computer software, firmware, or combinations thereof. To clearly illustrate this interchangeability of hardware and software, various illustrative components, blocks, engines, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as engines, modules, or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for image processing, the apparatus comprising: at least one memory; and at least one processor coupled to the at least one memory and configured to: obtain, over a duration of time, a plurality of image frames of a three-dimensional (3D) scene, wherein each image frame of the plurality of image frames comprises a plurality of two-dimensional (2D) points, and wherein each 2D point of the plurality of 2D points corresponds to a 3D point of a plurality of 3D points in the 3D scene; determine a subset of 3D points based on applying a bundle adjustment algorithm on a set of 3D points of the plurality of 3D points and on fixed parameters of a camera, wherein the set of 3D points are distributed over a field of view of the camera; determine a set of inlier points from the subset of 3D points based on 3D points of the subset of 3D points with a reprojection error less than a threshold value; determine a final subset of 3D points and a final set of parameters of the camera based on applying the bundle adjustment algorithm on the set of inlier points and on a prior set of parameters of the camera; and apply, to the camera, final intrinsic parameters of the final set of parameters of the camera.

Aspect 2. The apparatus of Aspect 1, wherein the set of 3D points comprises an initial set of 3D points.

Aspect 3. The apparatus of Aspect 2, wherein each 3D point of the initial set of 3D points corresponds to a plurality of 2D points within a track of a plurality of tracks.

Aspect 4. The apparatus of Aspect 3, wherein each track of the plurality of tracks includes the plurality of 2D points over two or more image frames of the plurality of image frames.

Aspect 5. The apparatus of any of Aspects 3 or 4, wherein the plurality of 2D points within a track of the plurality of tracks have similar features.

Aspect 6. The apparatus of any of Aspects 1 to 5, wherein the camera is one of a pinhole camera or a fisheye camera.

Aspect 7. The apparatus of any of Aspects 1 to 6, wherein the set of 3D points of the plurality of 3D points correspond to 2D points within a subset of image frames of the plurality of image frames.

Aspect 8. The apparatus of any of Aspects 1 to 7, wherein the fixed parameters of the camera comprise view parameters and intrinsic parameters.

Aspect 9. The apparatus of any of Aspects 1 to 8, wherein the fixed parameters of the camera comprise fixed lens distortion parameters of the camera.

Aspect 10. The apparatus of any of Aspects 1 to 9, wherein the prior set of parameters comprises an initial set of parameters of the camera.

Aspect 11. The apparatus of Aspect 10, wherein the initial set of parameters of the camera comprise an initial set of view parameters and an initial set of intrinsic parameters.

Aspect 12. The apparatus of Aspect 11, wherein the initial set of intrinsic parameters comprise at least one of nominal intrinsic values, previously estimated intrinsic values, randomized intrinsic values based on at least one of the nominal intrinsic values or the previously estimated intrinsic values, or intrinsic values from a table comprising the nominal intrinsic values as a function of temperature of the camera.

Aspect 13. The apparatus of any of Aspects 11 or 12, wherein the camera is associated with a vehicle, and wherein the initial set of view parameters are based on at least one of a signal of the vehicle or visual odometry.

Aspect 14. The apparatus of Aspect 13, wherein the signal of the vehicle comprises at least one of a speed of the vehicle or a yaw rate of the vehicle.

Aspect 15. The apparatus of any of Aspects 1 to 14, wherein the final set of parameters of the camera comprise final view parameters and the final intrinsic parameters.

Aspect 16. The apparatus of any of Aspects 1 to 15, wherein the final intrinsic parameters comprise a focal length and a principal point for the camera.

Aspect 17. The apparatus of any of Aspects 1 to 16, wherein the final intrinsic parameters compensate for at least one of a windshield distortion bias affecting the camera or a rolling shutter bias affecting the camera.

Aspect 18. A method of image processing, the method comprising: obtaining, by a processor over a duration of time, a plurality of image frames of a three-dimensional (3D) scene, wherein each image frame of the plurality of image frames comprises a plurality of two-dimensional (2D) points, and wherein each 2D point of the plurality of 2D points corresponds to a 3D point of a plurality of 3D points in the 3D scene; determining, by the processor, a subset of 3D points based on applying a bundle adjustment algorithm on a set of 3D points of the plurality of 3D points and on fixed parameters of a camera, wherein the set of 3D points are distributed over a field of view of the camera; determining, by the processor, a set of inlier points from the subset of 3D points based on 3D points of the subset of 3D points with a reprojection error less than a threshold value; determining, by the processor, a final subset of 3D points and a final set of parameters of the camera based on applying the bundle adjustment algorithm on the set of inlier points and on a prior set of parameters of the camera; and applying, by the processor to the camera, final intrinsic parameters of the final set of parameters of the camera.

Aspect 19. The method of Aspect 18, wherein the set of 3D points comprises an initial set of 3D points.

Aspect 20. The method of Aspect 19, wherein each 3D point of the initial set of 3D points corresponds to a plurality of 2D points within a track of a plurality of tracks.

Aspect 21. The method of Aspect 20, wherein each track of the plurality of tracks includes the plurality of 2D points over two or more image frames of the plurality of image frames.

Aspect 22. The method of any of Aspects 20 or 21, wherein the plurality of 2D points within a track of the plurality of tracks have similar features.

Aspect 23. The method of any of Aspects 18 to 22, wherein the camera is one of a pinhole camera or a fisheye camera.

Aspect 24. The method of any of Aspects 18 to 23, wherein the set of 3D points of the plurality of 3D points correspond to 2D points within a subset of image frames of the plurality of image frames.

Aspect 25. The method of any of Aspects 18 to 24, wherein the fixed parameters of the camera comprise view parameters and intrinsic parameters.

Aspect 26. The method of any of Aspects 18 to 25, wherein the fixed parameters of the camera comprise fixed lens distortion parameters of the camera.

Aspect 27. The method of any of Aspects 18 to 26, wherein the prior set of parameters comprises an initial set of parameters of the camera.

Aspect 28. The method of Aspect 27, wherein the initial set of parameters of the camera comprise an initial set of view parameters and an initial set of intrinsic parameters.

Aspect 29. The method of Aspect 28, wherein the initial set of intrinsic parameters comprise at least one of nominal intrinsic values, previously estimated intrinsic values, randomized intrinsic values based on at least one of the nominal intrinsic values or the previously estimated intrinsic values, or intrinsic values from a table comprising the nominal intrinsic values as a function of temperature of the camera.

Aspect 30. The method of any of Aspects 28 or 29, wherein the camera is associated with a vehicle, and wherein the initial set of view parameters are based on at least one of a signal of the vehicle or visual odometry.

Aspect 31. The method of Aspect 30, wherein the signal of the vehicle comprises at least one of a speed of the vehicle or a yaw rate of the vehicle.

Aspect 32. The method of any of Aspects 18 to 31, wherein the final set of parameters of the camera comprise final view parameters and the final intrinsic parameters.

Aspect 33. The method of any of Aspects 18 to 32, wherein the final intrinsic parameters comprise a focal length and a principal point for the camera.

Aspect 34. The method of any of Aspects 18 to 33, wherein the final intrinsic parameters compensate for at least one of a windshield distortion bias affecting the camera or a rolling shutter bias affecting the camera.

Aspect 35. A non-transitory computer-readable medium having stored thereon instructions that, when executed by at least one processor, cause the at least one processor to perform operations according to any of Aspects 18 to 34.

Aspect 36. An apparatus for image processing, the apparatus including one or more means for performing operations according to any of Aspects 18 to 34.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more."

What is claimed is:

1. An apparatus for image processing, the apparatus comprising:

at least one memory; and at least one processor coupled to the at least one memory and configured to:

obtain, over a duration of time, a plurality of image frames of a three-dimensional (3D) scene, wherein each image frame of the plurality of image frames comprises a plurality of two-dimensional (2D) points, and wherein each 2D point of the plurality of 2D points corresponds to a 3D point of a plurality of 3D points in the 3D scene;

determine a subset of 3D points based on applying a bundle adjustment algorithm on a set of 3D points of the plurality of 3D points and on fixed parameters of a camera, wherein the set of 3D points are distributed over a field of view of the camera;

determine a set of inlier points from the subset of 3D points based on 3D points of the subset of 3D points with a reprojection error less than a threshold value;

determine a final subset of 3D points and a final set of parameters of the camera based on applying the bundle adjustment algorithm on the set of inlier points and on a prior set of parameters of the camera;

apply, to the camera, final intrinsic parameters of the final set of parameters of the camera; and obtain at least one image frame captured by the camera using the final intrinsic parameters.

2. The apparatus of claim 1, wherein the set of 3D points comprises an initial set of 3D points.

3. The apparatus of claim 2, wherein each 3D point of the initial set of 3D points corresponds to a plurality of 2D points within a track of a plurality of tracks.

4. The apparatus of claim 3, wherein each track of the plurality of tracks includes the plurality of 2D points over two or more image frames of the plurality of image frames.

5. The apparatus of claim 3, wherein the plurality of 2D points within a track of the plurality of tracks have similar features.

6. The apparatus of claim 1, wherein the camera is one of a pinhole camera or a fisheye camera.

7. The apparatus of claim 1, wherein the set of 3D points of the plurality of 3D points correspond to 2D points within a subset of image frames of the plurality of image frames.

8. The apparatus of claim 1, wherein the fixed parameters of the camera comprise fixed lens distortion parameters of the camera.

9. The apparatus of claim 1, wherein the prior set of parameters comprises an initial set of parameters of the camera.

10. The apparatus of claim 9, wherein the initial set of parameters of the camera comprise an initial set of view parameters and an initial set of intrinsic parameters.

11. The apparatus of claim 10, wherein the initial set of intrinsic parameters comprise at least one of nominal intrinsic values, previously estimated intrinsic values, randomized intrinsic values based on at least one of the nominal intrinsic values or the previously estimated intrinsic values, or intrinsic values from a table comprising the nominal intrinsic values as a function of temperature of the camera.

12. The apparatus of claim 10, wherein the camera is associated with a vehicle, and wherein the initial set of view parameters are based on at least one of a signal of the vehicle or visual odometry.

13. The apparatus of claim 12, wherein the signal of the vehicle comprises at least one of a speed of the vehicle or a yaw rate of the vehicle.

14. The apparatus of claim 1, wherein the final set of parameters of the camera comprise final view parameters and the final intrinsic parameters.

15. The apparatus of claim 1, wherein the final intrinsic parameters comprise a focal length and a principal point for the camera.

16. The apparatus of claim 1, wherein the final intrinsic parameters compensate for at least one of a windshield distortion bias affecting the camera or a rolling shutter bias affecting the camera.

17. A method of image processing, the method comprising:

obtaining, by a processor over a duration of time, a plurality of image frames of a three-dimensional (3D) scene, wherein each image frame of the plurality of image frames comprises a plurality of two-dimensional (2D) points, and wherein each 2D point of the plurality of 2D points corresponds to a 3D point of a plurality of 3D points in the 3D scene;

determining, by the processor, a subset of 3D points based on applying a bundle adjustment algorithm on a set of 3D points of the plurality of 3D points and on fixed parameters of a camera, wherein the set of 3D points are distributed over a field of view of the camera;

determining, by the processor, a set of inlier points from the subset of 3D points based on 3D points of the subset of 3D points with a reprojection error less than a threshold value;

determining, by the processor, a final subset of 3D points and a final set of parameters of the camera based on applying the bundle adjustment algorithm on the set of inlier points and on a prior set of parameters of the camera;

applying, by the processor to the camera, final intrinsic parameters of the final set of parameters of the camera; and obtaining at least one image frame captured by the camera using the final intrinsic parameters.

18. The method of claim 17, wherein the set of 3D points comprises an initial set of 3D points.

19. The method of claim 18, wherein each 3D point of the initial set of 3D points corresponds to a plurality of 2D points within a track of a plurality of tracks.

20. The method of claim 19, wherein each track of the plurality of tracks includes the plurality of 2D points over two or more image frames of the plurality of image frames.

* * * * *